(12) United States Patent
Wu et al.

(10) Patent No.: US 12,542,840 B2
(45) Date of Patent: Feb. 3, 2026

(54) FOLDING ASSEMBLY AND ELECTRONIC DEVICE

(71) Applicant: HUAWEI TECHNOLOGIES CO., LTD., Guangdong (CN)

(72) Inventors: Weifeng Wu, Dongguan (CN); Ding Zhong, Dongguan (CN); Li Liao, Dongguan (CN); Qiao Deng, Yokohama (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 271 days.

(21) Appl. No.: 18/191,080

(22) Filed: Mar. 28, 2023

(65) Prior Publication Data

US 2023/0262150 A1  Aug. 17, 2023

Related U.S. Application Data

(63) Continuation of application No. PCT/CN2021/097465, filed on May 31, 2021.

(30) Foreign Application Priority Data

Sep. 29, 2020  (CN) .......................... 202011053835.5

(51) Int. Cl.
*H04B 1/38* (2015.01)
*F16C 11/04* (2006.01)
*H04M 1/02* (2006.01)

(52) U.S. Cl.
CPC ........... *H04M 1/0237* (2013.01); *F16C 11/04* (2013.01)

(58) Field of Classification Search
CPC .. H04M 1/0208; H04M 1/0214; H04M 1/022; H04M 1/0237
See application file for complete search history.

(56) References Cited

U.S. PATENT DOCUMENTS 9,841,789 B2  12/2017  Lin et al.
10,465,427 B2  11/2019  Chen et al.
(Continued)

FOREIGN PATENT DOCUMENTS

| CN | 105549690 A | 5/2016 |
|---|---|---|
| EP | 3910919 A1 | 11/2021 |
| WO | 2020173269 A1 | 9/2020 |

OTHER PUBLICATIONS

Extended European Search Report issued in EP21873907.6, dated Feb. 1, 2024, 10 pages.

(Continued)

*Primary Examiner* — Tuan Pham

(57) ABSTRACT

A folding assembly and an electronic device are disclosed. The folding assembly includes a first bracket, a second bracket, and a rotating mechanism. The rotating mechanism includes a fastening structure, a first synchronous arm, a second synchronous arm, and a connecting structure. The first synchronous arm is connected to the first bracket, and is rotatably connected to the fastening structure by using the first shaft. The second synchronous arm is connected to the second bracket, and is rotatably connected to the fastening structure by using the second shaft. The connecting structure is rotatably connected to the first synchronous arm by using the third shaft and is rotatably connected to the second synchronous arm by using the fourth shaft, where the third shaft and the first shaft are spaced from each other, and the fourth shaft and the second shaft are spaced from each other.

20 Claims, 17 Drawing Sheets

(56) References Cited

U.S. PATENT DOCUMENTS

2018/0024596 A1* 1/2018 Park ................ G06F 1/1681
                                                  361/679.55
2021/0011522 A1* 1/2021 Watamura ............ G06F 1/1681

OTHER PUBLICATIONS

Office Action issued in IN202327023160, dated Aug. 27, 2024, 8 pages.

* cited by examiner

FOLDING ASSEMBLY AND ELECTRONIC DEVICE

CROSS-REFERENCE TO RELATED APPLICATIONS

This application is a continuation of International Application No. PCT/CN2021/097465, filed on May 31, 2021, which claims priority to Chinese Patent Application No. 202011053835.5, filed on Sep. 29, 2020. The disclosures of the aforementioned applications are hereby incorporated by reference in their entireties.

TECHNICAL FIELD

The present disclosure relates to the technical field of folding electronic products, and in particular, to a folding assembly and an electronic device.

BACKGROUND

As technologies of flexible folding displays become increasingly mature, a flexible folding terminal product has become a major trend. A folding terminal product (for example, an electronic device such as a folding mobile phone, a folding tablet, or a folding computer) needs to provide high reliability and good operation experience. A folding terminal product usually includes two housings and a rotating mechanism located between the two housings. The rotating mechanism can control, through deformation, the two housings to fold or unfold relative to each other. However, a rotating mechanism of a conventional folding terminal product usually uses complex components such as multi-stage gears to transfer motion. This involves a large quantity of components and a complex cooperation relationship. As a result, synchronous movement performance of the two housings is easily degraded during deformation, and user experience is affected.

SUMMARY

Embodiments of the present disclosure provide a folding assembly and an electronic device. A rotating mechanism of the folding assembly features a small quantity of components and a simple cooperation relationship, and can ensure synchronous movement of two housings in a deformation process. Therefore, user experience is improved.

According to a first aspect, the present disclosure provides a folding assembly. The folding assembly includes a first bracket, a second bracket, and a rotating mechanism.

The rotating mechanism includes a fastening structure, a first synchronous arm, a second synchronous arm, a connecting structure, a first shaft, a second shaft, a third shaft, and a fourth shaft.

The first synchronous arm is connected to the first bracket, and is rotatably connected to the fastening structure by using the first shaft.

The second synchronous arm is connected to the second bracket, and is rotatably connected to the fastening structure by using the second shaft.

The connecting structure is rotatably connected to the first synchronous arm by using the third shaft and is rotatably connected to the second synchronous arm by using the fourth shaft, where the third shaft and the first shaft are spaced from each other, and the fourth shaft and the second shaft are spaced from each other.

The first synchronous arm can rotate relative to the fastening structure and drive, by using the connecting structure, the second synchronous arm to rotate relative to the fastening structure, so that the first bracket and the second bracket are folded or unfolded relative to each other.

In the technical solutions of the present disclosure, the connecting structure is connected to the first synchronous arm and the second synchronous arm. This way, when the first synchronous arm rotates as the driving member, a change of coordinates at a joint between the first synchronous arm and the connecting structure can drive the connecting structure to move. Then, a power transmission function of the connecting structure drives the second synchronous arm to passively rotate. In other words, the second synchronous arm is driven to synchronously rotate as the driven member. When the second synchronous arm rotates as the driving member, a change of coordinates at a joint between the second synchronous arm and the connecting structure can drive the connecting structure to move. Then, the power transmission function of the connecting structure drives the first synchronous arm to passively rotate. In other words, the first synchronous arm is driven to synchronous rotate as the driven member.

Therefore, regardless of which one of the first synchronous arm and the second synchronous arm rotates as the driving member, the other of the first synchronous arm and the second synchronous arm can synchronously rotate as the driven member under an action of the connecting structure. This way, the first synchronous arm and the second synchronous arm can rotate synchronously and consistently. To be specific, the first synchronous arm and the second synchronous arm can synchronously rotate towards each other to be closer or synchronously rotate backwards to be farther away. In addition, the first synchronous arm is connected to the first bracket, and the second synchronous arm is connected to the second bracket. Therefore, in a process in which the first synchronous arm and the second synchronous arm approach each other, the first bracket and the second bracket may be folded relative to each other. In a process in which the first synchronous arm and the second synchronous arm depart from each other, the first bracket and the second bracket may be unfolded relative to each other. This also ensures synchronization and consistency between the first bracket and the second bracket.

In addition, the rotating mechanism has a small quantity of components and a simple component cooperation relationship, and features a short drive chain, a small quantity of motion transmissions, and a small cumulative error. Therefore, the rotating mechanism has high control precision, and movement of the two housings can be synchronized in a deformation process. This improves rotation precision of the folding assembly, and helps improve user experience of the electronic device to which the folding assembly is applied.

In a possible implementation, a center line of the first shaft is a first axis, and the first synchronous arm can rotate around the first axis relative to the fastening structure.

A center line of the second shaft is a second axis, and the second synchronous arm can rotate around the second axis relative to the fastening structure.

The first axis and the second axis are asymmetrically disposed.

It may be understood that positions of the first shaft and the second shaft are fixed relative to the whole device. In addition, the first shaft is collinear with a rotation center of the first synchronous arm, and the second shaft is collinear with a rotation center of the second synchronous arm. In other words, positions of rotation centers of the first synchronous arm and the second synchronous arm are fixed and do not change. Therefore, when connected to the fastening structure, the first synchronous arm and the second synchronous arm can rotate stably and reliably because the positions of the rotation centers of the first synchronous arm and the second synchronous arm are fixed. In addition, when the first synchronous arm and the second synchronous arm rotate, a rotation angle of the first bracket relative to the fastening structure can be the same as that of the second bracket relative to the fastening structure. This ensures synchronous and consistent rotation actions between the first bracket and the second bracket and symmetrical folding and unfolding actions of the folding assembly. Therefore, user experience can be improved.

Moreover, the first shaft and the second shaft are connected to the fastening structure. Therefore, the first shaft and the second shaft have fixed positions. The third shaft and the fourth shaft are connected to the connecting structure. Therefore, the third shaft and the fourth shaft have non-fixed positions. Therefore, axes of the first shaft and the second shaft are fixed, and axes of the third shaft and the fourth shaft are non-fixed. An axis is a center line of a shaft.

In the technical solutions of the present disclosure, the first axis (that is, the axis of the first shaft) and the second axis (that is, the axis of the second shaft) may be asymmetrically disposed. This way, a staggered layout of "fixed axis-non-fixed axis-fixed axis-non-fixed axis" can be formed between shafts that are connected to the connecting structure and the fastening structure in the rotating mechanism.

Therefore, the first synchronous arm and the second synchronous arm can rotate synchronously and consistently. In addition, relative positions of a plurality of shafts may be diversified. This is highly practicable and can be widely applied.

In a possible implementation, the rotating mechanism further includes a first connecting shaft and a second connecting shaft.

The first synchronous arm includes a sliding end and a rotating end, the sliding end of the first synchronous arm is slidably connected to the first bracket by using the first connecting shaft, the first shaft and the third shaft are connected to the rotating end of the first synchronous arm, and the first shaft is close to the sliding end of the first synchronous arm relative to the third shaft.

The second synchronous arm includes a sliding end and a rotating end, the sliding end of the second synchronous arm is slidably connected to the second bracket by using the second connecting shaft, the second shaft and the fourth shaft are connected to the rotating end of the second synchronous arm, and the fourth shaft is close to the sliding end of the second synchronous arm relative to the second shaft.

In a possible implementation, the sliding end of the first synchronous arm is rotatably connected to the first bracket by using the first connecting shaft, and the sliding end of the second synchronous arm is rotatably connected to the second bracket by using the second connecting shaft.

It may be understood that the sliding end of the first synchronous arm is movably (slidably and rotatably) connected to the first bracket, and the sliding end of the second synchronous arm is movably (slidably and rotatably) connected to the second bracket. In a process in which the first bracket and the second bracket are folded or unfolded relative to each other, the sliding end of the first synchronous arm slides and rotates relative to the first bracket, so as to drive the first bracket rotate synchronously. The sliding end of the second synchronous arm slides and rotates relative to the second bracket, so as to drive the second bracket rotate synchronously.

A plurality of shafts is disposed. This way, each component in the rotating mechanism can be connected. In addition, the rotating mechanism can be connected to the first bracket and the second bracket. A conventional rotating mechanism uses complex structures such as meshed gears to establish connections between components. However, in this embodiment, reliable connections can be established only through cooperation between shafts and components. The structure is simple, and easy machining operations are involved. Therefore, high machining precision can be achieved with ease.

The rotating mechanism has a small quantity of components, a simple cooperation relationship, and simple cooperation positions. The components are easy to manufacture and assemble. This facilitates mass production. In addition, the components of the rotating mechanism are connected through hole-shaft cooperation. The structure is simple, and small space is occupied. Therefore, the folding assembly and the electronic device are lighter and thinner. Further, a machining tolerance for a component can be small, and a gap generated in hole-shaft cooperation is easy to control. This can minimize a synchronization angle deviation of the rotating mechanism. Therefore, when the rotating mechanism acts on the first bracket and the second bracket, the first bracket and the second bracket can be efficiently synchronized.

It may be understood that a gap deviation may be generated at a joint of each component in the rotating mechanism due to a machining tolerance. The synchronization angle deviation is a rotation angle difference caused by a gap deviation when the first synchronous arm and the second synchronous arm synchronously rotate. Specifically, in an ideal state, when the first synchronous arm rotates by any angle from 0° to 90° relative to the fastening structure, the second synchronous arm can synchronously rotate by the corresponding degree relative to the fastening structure. However, a rotation angle of the first synchronous arm relative to the fastening structure may differ from a rotation angle of the second synchronous arm relative to the fastening structure due to a machining tolerance. For example, the first synchronous arm rotates by 10° relative to the fastening structure, and the second synchronous arm rotates by 9° relative to the fastening structure. In this case, a rotation angle difference between the first synchronous arm and the second synchronous arm is 1°. Hole-shaft cooperation features high machining precision and easy-to-control gaps. If the components of the rotating mechanism are connected through hole-shaft cooperation, the rotation angle difference between the first synchronous arm and the second synchronous arm can be minimized, and the first synchronous arm and the second synchronous arm can be efficiently synchronized.

In a possible implementation, one of the first bracket and the sliding end of the first synchronous arm is provided with a first sliding groove, the other of the first bracket and the sliding end of the first synchronous arm is provided with the first connecting shaft, and the first sliding groove and the first connecting shaft are connected in a fitting manner so that the first bracket and the sliding end of the first synchronous arm can slide relative to each other.

One of the second bracket and the sliding end of the second synchronous arm is provided with a second sliding groove, the other of the second bracket and the sliding end of the second synchronous arm is provided with the second connecting shaft, and the second sliding groove and the second connecting shaft are connected in a fitting manner so that the second bracket and the sliding end of the second synchronous arm can slide relative to each other.

Therefore, the sliding end of the first synchronous arm and the first bracket can slide relative to each other, regardless of whether the first sliding groove is disposed on the first bracket and the first connecting shaft is disposed on the sliding end of the first synchronous arm, or the first sliding groove is disposed on the sliding end of the first synchronous arm and the first connecting shaft is disposed on the first bracket. This provides possibilities for diversified connections. In addition, this is highly practicable and can be widely applied.

Therefore, the sliding end of the second synchronous arm and the second bracket can slide relative to each other, regardless of whether the second sliding groove is disposed on the second bracket and the second connecting shaft is disposed on the sliding end of the second synchronous arm, or the second sliding groove is disposed on the sliding end of the second synchronous arm and the second connecting shaft is disposed on the second bracket. This provides possibilities for diversified connections. In addition, this is highly practicable and can be widely applied.

For example, the first sliding groove is disposed on the first bracket. The first connecting shaft passes through the sliding end of the first synchronous arm, extends out of both sides of the first synchronous arm, and is connected to the first sliding groove. In addition, the first connecting shaft can slide relative to the first sliding groove.

The second sliding groove is disposed on the second bracket. The second connecting shaft passes through the sliding end of the second synchronous arm, extends out of both ends of the second synchronous arm, and is connected to the second sliding groove. In addition, the second connecting shaft can slide relative to the second sliding groove.

In a possible implementation, the connecting structure is a connecting rod, where the first synchronous arm can rotate clockwise around the first shaft and drive the connecting rod to move towards the first synchronous arm, and the second synchronous arm is driven by the connecting rod to rotate counterclockwise around the second shaft, so that the first bracket and the second bracket are folded relative to each other.

Alternatively, the first synchronous arm can rotate counterclockwise around the first shaft and drive the connecting rod to move towards the second synchronous arm, and the second synchronous arm is driven by the connecting rod to rotate clockwise around the second shaft, so that the first bracket and the second bracket are unfolded relative to each other.

Therefore, in a process of folding and unfolding the folding assembly, a rotation action of the first synchronous arm relative to the fastening structure is symmetrical to a rotation action of the second synchronous arm relative to the fastening structure. This way, rotation actions of the first bracket and the second bracket relative to the support are synchronized. In other words, the first bracket and the second bracket synchronously approach each other or depart from each other. As a result, the rotation actions of the first bracket and the second bracket relative to the support are effectively synchronized, and mechanism operation experience of the folding assembly and the electronic device is improved.

In a possible implementation, the fastening structure includes a first fastening bracket and a second fastening bracket.

The first fastening bracket and the second fastening bracket are spaced from each other in an axial direction, and the rotating end of the first synchronous arm and the rotating end of the second synchronous arm are sandwiched between the first fastening bracket and the second fastening bracket.

The first shaft passes through the rotating end of the first synchronous arm, one end of the first shaft is connected to the first fastening bracket, and the other end of the first shaft is connected to the second fastening bracket.

There are two second shafts, center lines of the two second shafts are collinear, one of the second shafts is connected to the first fastening bracket and the rotating end of the second synchronous arm, and the other of the second shafts is connected to the second fastening bracket and the rotating end of the second synchronous arm.

It may be understood that the axial direction is a direction along which the first shaft extends. The first fastening bracket and the second fastening bracket that are spaced from each other form space for mounting the rotating mechanism, and can guide the mounting of the rotating mechanism. In addition, the first fastening bracket and the second fastening bracket are disposed and connected to the first synchronous arm and the second synchronous arm. This minimizes a possibility that the first synchronous arm and the second synchronous arm get loose, and ensures robust connection between and reliable and stable rotation of the first synchronous arm and the second synchronous arm.

In a possible implementation, the connecting structure is the connecting rod, the rotating end of the first synchronous arm is provided with a first accommodating groove, the rotating end of the second synchronous arm is provided with a second accommodating groove, and two ends of the connecting rod are respectively mounted in the first accommodating groove and the second accommodating groove.

The two ends of the connecting rod are respectively mounted in the first accommodating groove and the second accommodating groove, so that the first accommodating groove and the second accommodating groove can accommodate at least a part of the connecting rod. This reduces space occupied by the rotating mechanism, and the folding assembly and the electronic device to which the folding assembly is applied are lighter and thinner.

In a possible implementation, the third shaft passes through the connecting rod, one end of the third shaft is connected to one side wall of the first accommodating groove, and the other end of the third shaft is connected to the other side wall of the first accommodating groove.

The fourth shaft passes through the connecting rod, one end of the fourth shaft is connected to one side wall of the second accommodating groove, and the other end of the fourth shaft is connected to the other side wall of the second accommodating groove.

In a possible implementation, a center line of the first shaft is a first axis, and a center line of the second shaft is a second axis, where the first axis and the second axis are symmetrically disposed.

It may be understood that positions of the first shaft and the second shaft are fixed relative to the whole device. In addition, the first shaft is collinear with a rotation center of the first synchronous arm, and the second shaft is collinear with a rotation center of the second synchronous arm. In other words, positions of rotation centers of the first synchronous arm and the second synchronous arm are fixed and do not change. Therefore, when connected to the fastening structure, the first synchronous arm and the second synchronous arm can rotate stably and reliably because the positions of the rotation centers of the first synchronous arm and the second synchronous arm are fixed. In addition, when the first synchronous arm and the second synchronous arm rotate, a rotation angle of the first bracket relative to the fastening structure can be the same as that of the second bracket relative to the fastening structure. This ensures synchronous and consistent rotation actions between the first bracket and the second bracket and symmetrical folding and unfolding actions of the folding assembly. Therefore, user experience can be improved.

Moreover, the first shaft and the second shaft are connected to the fastening structure. Therefore, the first shaft and the second shaft have fixed positions. The third shaft and the fourth shaft are connected to the connecting structure. Therefore, the third shaft and the fourth shaft have non-fixed positions. Therefore, axes of the first shaft and the second shaft are fixed, and axes of the third shaft and the fourth shaft are non-fixed. An axis is a center line of a shaft.

In the technical solutions of the present disclosure, the first axis (that is, the axis of the first shaft) and the second axis (that is, the axis of the second shaft) may be symmetrically disposed. This way, a symmetrical layout of "fixed axis-non-fixed axis-non-fixed axis-fixed axis" can be formed between shafts that are connected to the connecting structure and the fastening structure in the rotating mechanism.

Therefore, the first synchronous arm and the second synchronous arm can rotate synchronously and consistently. This is highly practicable and can be widely applied.

In a possible implementation, the rotating mechanism further includes a fifth shaft, the connecting structure includes a first connecting rod and a second connecting rod, the first connecting rod includes a driving end and a sliding end, and the second connecting rod includes a driving end and a sliding end.

The driving end of the first connecting rod is rotatably connected to the first synchronous arm by using the third shaft, the driving end of the second connecting rod is rotatably connected to the second synchronous arm by using the fourth shaft, and the sliding end of the first connecting rod is rotatably connected to the sliding end of the second connecting rod by using the fifth shaft.

The fastening structure is provided with a chute, an extension direction of the chute is perpendicular to an extension direction of the fastening structure, and the fifth shaft is slidably connected to the chute.

Movement of the fifth shaft in the chute drives the sliding end of the first connecting rod and the sliding end of the second connecting rod to move relative to the chute, so that the first connecting rod and the second connecting rod are folded or unfolded relative to each other.

It may be understood that the chute can convert synchronous movement of the first connecting rod and the second connecting rod relative to the chute into relative rotation between the first connecting rod and the second connecting rod. This way, the first synchronous arm and the second synchronous arm can synchronously rotate (approach each other or depart from each other). In addition, the first connecting rod can be linked with the first bracket through the first synchronous arm, and the second connecting rod can be linked with the second bracket through the second synchronous arm. Therefore, the rotating mechanism has high tensile strength and strong extrusion resistance as a whole.

In a possible implementation, when the fifth shaft is located at a top of the chute, the first connecting rod and the second connecting rod are unfolded relative to each other, and the first synchronous arm and the second synchronous arm approach each other.

When the fifth shaft is located at a bottom of the chute, the first connecting rod and the second connecting rod are folded relative to each other, and the first synchronous arm and the second synchronous arm depart from each other.

In a possible implementation, the first synchronous arm can rotate counterclockwise around the first shaft and drive the first connecting rod and the second connecting rod to move upwards relative to the bottom of the chute, and the second synchronous arm is driven by the second connecting rod to rotate clockwise around the second shaft, so that the first bracket and the second bracket are folded relative to each other.

The first synchronous arm can rotate clockwise around the first shaft and drive the first connecting rod and the second connecting rod to move downwards relative to the top of the chute, and the second synchronous arm is driven by the second connecting rod to rotate counterclockwise around the second shaft, so that the first bracket and the second bracket are unfolded relative to each other.

Therefore, in a process of folding and unfolding the folding assembly, a rotation action of the first synchronous arm relative to the chute is symmetrical to a rotation action of the second synchronous arm relative to the chute, and a rotation action of the first connecting rod relative to the chute is symmetrical to a rotation action of second connecting rod relative to the chute. This way, rotation actions of the first bracket and the second bracket relative to the support are synchronized. In other words, the first bracket and the second bracket synchronously approach each other or depart from each other. As a result, the rotation actions of the first bracket and the second bracket relative to the support are effectively synchronized, and mechanism operation experience of the folding assembly and the electronic device is improved.

In a possible implementation, the rotating mechanism further includes a fifth shaft, a sixth shaft, and a seventh shaft, and the connecting structure includes a first connecting rod, a second connecting rod, and a third connecting rod that are sequentially connected.

One end of the first connecting rod is rotatably connected to the first synchronous arm by using the third shaft, the other end of the first connecting rod is rotatably connected to one end of the second connecting rod by using the fifth shaft, the second connecting rod is rotatably connected to the fastening structure by using the sixth shaft, the other end of the second connecting rod is rotatably connected to one end of the third connecting rod by using the seventh shaft, and the other end of the third connecting rod is rotatably connected to the second synchronous arm by using the fourth shaft.

The second connecting rod can rotate around the sixth shaft relative to the fastening structure.

It may be understood that the rotating mechanism uses multi-stage connecting rods for motion transmission, so as to ensure synchronous rotation of the two brackets of the folding assembly. Compared with a conventional solution that uses gears for synchronization and features small-sized individual components, the solution provided in this embodiment uses multi-stage connecting rods for motion transmission and features relatively large-sized components. The overall structural strength is high and reliability is high. The rotating mechanism has a small quantity of components, a simple cooperation relationship, and simple cooperation positions. The components are easy to manufacture and assemble. This facilitates mass production. In addition, the components of the rotating mechanism are generally connected through hole-shaft cooperation. The structure is simple, and small space is occupied. Therefore, the folding assembly and the electronic device are lighter and thinner. Further, a machining tolerance for a component can be small, and a gap generated in hole-shaft cooperation is easy to control. This can minimize a synchronization angle deviation of the rotating mechanism. Therefore, when the rotating mechanism acts on the first bracket and the second bracket, the first bracket and the second bracket can be efficiently synchronized.

In a possible implementation, the first synchronous arm can rotate clockwise around the first shaft and drive the first connecting rod to move towards the first synchronous arm, the second connecting rod is driven by the first connecting rod to rotate counterclockwise around the sixth shaft and drives the third connecting rod to move towards the second synchronous arm, and the second synchronous arm is driven by the third connecting rod to rotate counterclockwise around the second shaft, so that the first bracket and the second bracket are folded relative to each other.

The first synchronous arm can rotate counterclockwise around the first shaft and drive the first connecting rod to move towards the second synchronous arm, the second connecting rod is driven by the first connecting rod to rotate clockwise around the sixth shaft and drives the third connecting rod to move towards the first synchronous arm, and the second synchronous arm is driven by the third connecting rod to rotate clockwise around the second shaft, so that the first bracket and the second bracket are unfolded relative to each other.

Therefore, in a process of folding and unfolding the folding assembly, a rotation action of the first synchronous arm relative to the fastening structure is symmetrical to a rotation action of the second synchronous arm relative to the fastening structure. This way, rotation actions of the first bracket and the second bracket relative to the support are synchronized. In other words, the first bracket and the second bracket synchronously approach each other or depart from each other. As a result, the rotation actions of the first bracket and the second bracket relative to the support are effectively synchronized, and mechanism operation experience of the folding assembly and the electronic device is improved.

In a possible implementation, when the first bracket and the second bracket are folded relative to each other to a closed state, the first connecting rod, the second connecting rod, and the third connecting rod are unfolded relative to each other. When the first bracket and the second bracket are unfolded relative to each other to a flattened state, the first connecting rod, the second connecting rod, and the third connecting rod are folded relative to each other.

According to a second aspect, the present disclosure provides an electronic device. The electronic device includes a flexible display and the folding assembly described in the foregoing aspect. Alternatively, the electronic device includes a first housing, a second housing, and the folding assembly described in the foregoing aspect, where a first bracket is fastened to the first housing, and a second bracket is fastened to the second housing.

It should be noted that the first bracket and the second bracket may be independent housing structures that can jointly bear the flexible display, and can be driven by the rotating mechanism, so that the first bracket and the second bracket that are used as housing structures can be folded and unfolded relative to each other. This further enables the electronic device to switch between a closed state and a flattened state, and be kept in the closed state and the flattened state. Alternatively, the first bracket and the second bracket may be independent components and can be driven by the rotating mechanism, so that the first bracket and the second bracket that are used as components can be folded and unfolded relative to each other. In addition, the first bracket is fastened to the first housing and the second bracket is fastened to the second housing. Therefore, the first bracket and the second bracket may be folded and unfolded relative to each other, so that the first housing and the second housing are folded and unfolded relative to each other. This further enables the electronic device to switch between a closed state and a flattened state, and be kept in the closed state and the flattened state.

A structure of the rotating mechanism provided in the technical solutions of the present disclosure features a small quantity of motion transmission stages. This way, rotation actions of the first synchronous arm and the second synchronous arm can be effectively synchronized. In addition, sizes of individual components can be adjusted to adapt to diversified application scenarios with different transmission distances (for example, sizes of the first synchronous arm, the connecting rod, and the second synchronous arm may be relatively large in an application scenario with a long transmission distance). This is highly practicable and can be widely applied. In addition, the first synchronous arm and the second synchronous arm can be symmetrically folded and unfolded, so that the first housing and the second housing rotate synchronously and consistently. This facilitates inward movement of the housings in a process in which the folding assembly switches from a flattened state to a closed state and outward movement of the housings in a process in which the folding assembly switches from the closed state to the flattened state. Therefore, user experience can be improved.

DESCRIPTION OF EMBODIMENTS

The following clearly describes specific implementations of the present disclosure with reference to the accompanying drawings.

Figure 1:
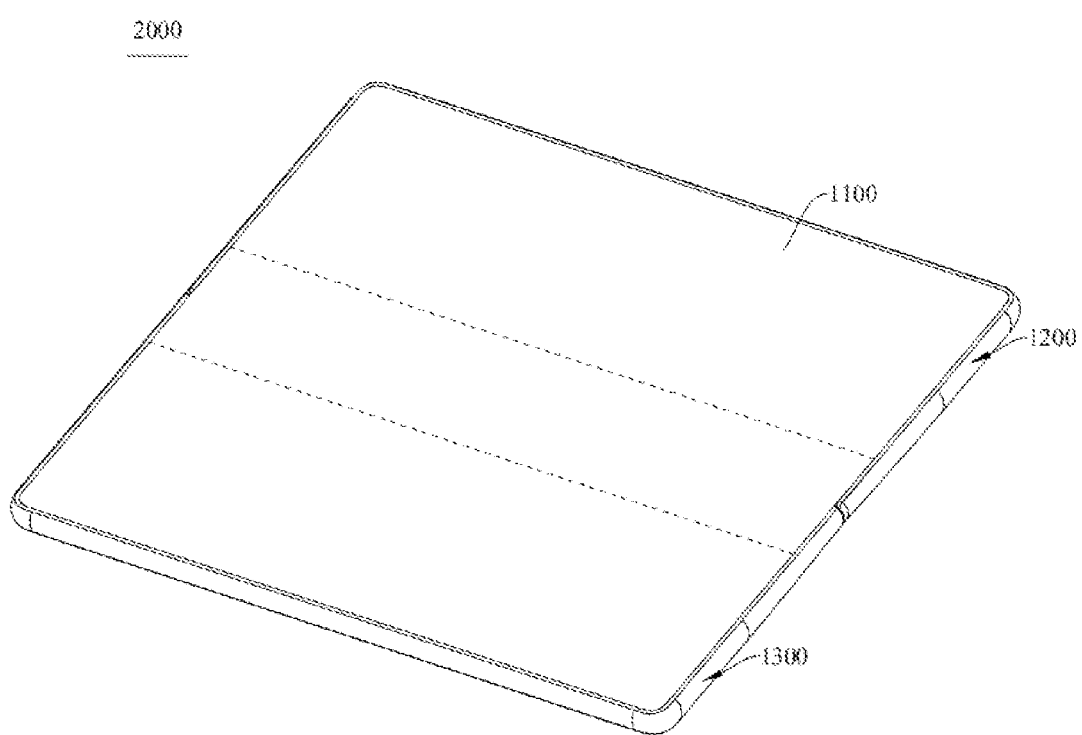
FIG. 1 is a schematic diagram depicting a structure of an electronic device according to an embodiment of the present disclosure.

Refer to FIG. 1. An embodiment of the present disclosure provides an electronic device 2000. The electronic device 2000 is foldable and may be, but is not limited to, a mobile phone, a tablet, an e-reader, a notebook computer, a vehicle-mounted device, or the like. For ease of understanding, an example in which the electronic device 2000 is a mobile phone that has a wide range of users and abundant application scenarios is used for description in this embodiment. However, this does not constitute a limitation.

Refer to FIG. 1 to FIG. 5. The electronic device 2000 includes a flexible display 1100, a first housing 1200, a second housing 1300, and a folding assembly 1000. The folding assembly 1000 may enable the first housing 1200 and the second housing 1300 to unfold to a flattened state, to fold to a closed state, or to bend to an intermediate state between the flattened state and the closed state. Therefore, the electronic device 2000 is foldable. The flexible display 1100 is fastened to the first housing 1200 and the second housing 1300, and can be configured to display information and provide an interaction interface for a user. The flexible display 1100 may be unfolded as the first housing 1200 and the second housing 1300 are unfolded relative to each other, and may be folded as the first housing 1200 and the second housing 1300 are folded relative to each other. For example, the flexible display 1100 may be fastened to the first housing 1200 and the second housing 1300 through glue dispensing.

It should be noted that FIG. 1 to FIG. 5 are merely used for schematically describing a connection relationship between the first housing 1200, the second housing 1300, the folding assembly 1000, and the flexible display 1100, and do not constitute a specific limitation on connection positions, specific structures, and quantities thereof. The structure shown in this embodiment does not constitute a specific limitation on the electronic device 2000. In some other embodiments of the present disclosure, the electronic device 2000 may include more or fewer components than those shown in the figure, or combine some components, or split some components, or use a different component layout. The components shown in the figure may be implemented by using hardware, software, or a combination of software and hardware.

Refer to FIG. 2 to FIG. 6. The folding assembly 1000 includes a rotating mechanism 100, a first bracket 200, a second bracket 300, and a support 400.

The support 400 can be kept static in a process in which the first bracket 200 and the second bracket 300 are folded and unfolded relative to each other. In other words, in a process in which the first bracket 200 and the second bracket 300 are folded and unfolded relative to each other, a position of the support 400 can be kept unchanged. Specifically, the support 400 is relatively static, but the first bracket 200 and the second bracket 300 may rotate relative to the support 400.

Figure 4:
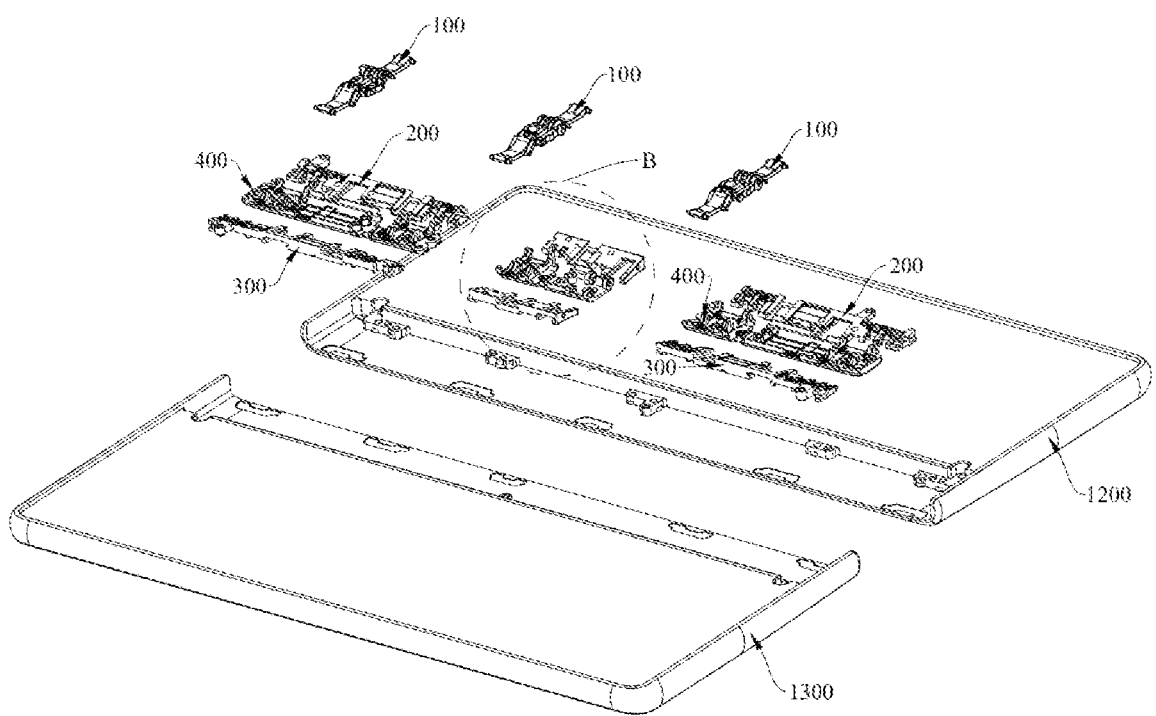
FIG. 4 is a schematic exploded view of a structure of a part of an electronic device according to an embodiment of the present disclosure.
Figure 5:
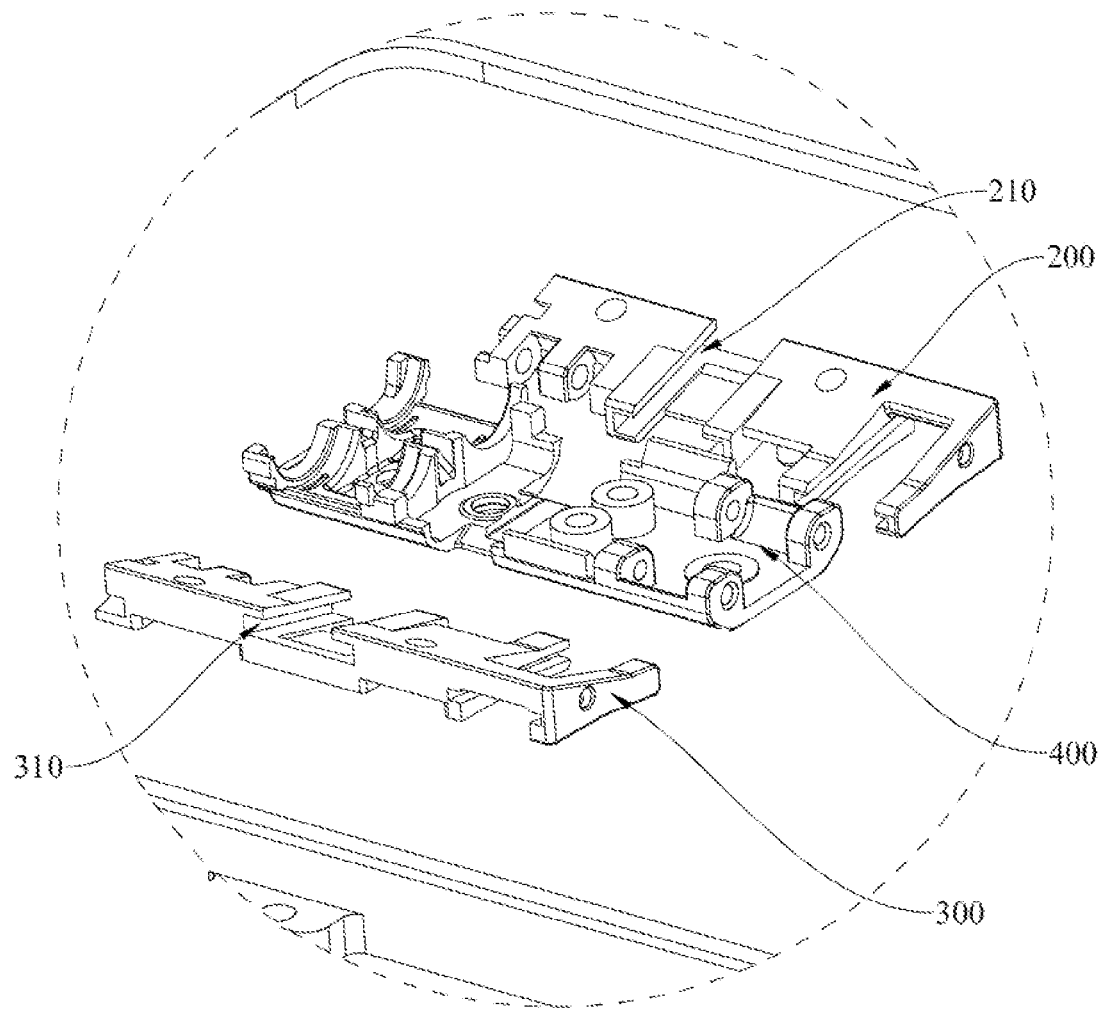
FIG. 5 is a schematic enlargement view of an area A of the electronic device shown in FIG. 4.

At least a part of the rotating mechanism 100 is fastened to the support 400. In addition, the rotating mechanism 100 is connected between the first bracket 200 and the second bracket 300, and is able to deform, so that the first bracket 200 and the second bracket 300 are folded or unfolded relative to each other. In other words, the rotating mechanism 100 enables the first bracket 200 and the second bracket 300 to move relative to each other. It may be understood that a quantity of rotating mechanisms 100 may be set based on an actual requirement, and there may be one, two, or more rotating mechanisms 100. This is not strictly limited in this embodiment. For example, as shown in FIG. 4, there may be three rotating mechanisms 100.

It should be noted that the first bracket 200 and the second bracket 300 may be independent housing structures that can jointly bear the flexible display 1100, and can be driven by the rotating mechanism 100, so that the first bracket 200 and the second bracket 300 that are used as housing structures can be folded and unfolded relative to each other. This further enables the electronic device 2000 to switch between a closed state and a flattened state, and be kept in the closed state and the flattened state. Alternatively, the first bracket 200 and the second bracket 300 may be independent components and can be driven by the rotating mechanism 100, so that the first bracket 200 and the second bracket 300 that are used as components can be folded and unfolded relative to each other.

The following uses an example in which the first bracket 200 and the second bracket 300 are independent components for description. In this example, the first bracket 200 and the second bracket 300 are folded and unfolded relative to each other so that the first housing 1200 and the second housing 1300 are folded and unfolded relative to each other. However, it should be understood that this is not limited thereto.

For example, the first bracket 200 is fastened to the first housing 1200, and the second bracket 300 is fastened to the second housing 1300. In this case, the first bracket 200 and the second bracket 300 may be folded and unfolded relative to each other, so that the first housing 1200 and the second housing 1300 are folded and unfolded relative to each other. This further enables the electronic device 2000 to switch between a closed state and a flattened state, and be kept in the closed state and the flattened state.

It may be understood that the first bracket 200 is fastened to the first housing 1200, and the second bracket 300 is fastened to the second housing 1300. Therefore, when the first bracket 200 and the second bracket 300 are folded relative to each other, the first housing 1200 and the second housing 1300 are also folded relative to each other. When the first bracket 200 and the second bracket 300 are unfolded relative to each other, the first housing 1200 and the second housing 1300 are also unfolded relative to each other.

On this basis, that "the first housing 1200 and the second housing 1300 are folded relative to each other" in the following may be equivalent to that "the first bracket 200 and the second bracket 300 are folded relative to each other", and that "the first housing 1200 and the second housing 1300 are unfolded relative to each other" may be equivalent to that "the first bracket 200 and the second bracket 300 are unfolded relative to each other". That "the first housing 1200 and the second housing 1300 are folded relative to each other to the closed state" may be equivalent to that "the first bracket 200 and the second bracket 300 are folded relative to each other to the closed state", and that "the first housing 1200 and the second housing 1300 are unfolded relative to each other to the flattened state" may be equivalent to that "the first bracket 200 and the second bracket 300 are unfolded relative to each other to the flattened state". Explanations for such description in the following are not provided.

In this embodiment, the first housing 1200 and the second housing 1300 may be unfolded relative to each other to the flattened state, so that the electronic device 2000 is in the flattened state. For example, when the first housing 1200 and the second housing 1300 are in the flattened state, an included angle between the first housing 1200 and the second housing 1300 may be approximately 180° (a slight deviation is allowed, for example, 175°, 178°, or) 185°. Alternatively, the first housing 1200 and the second housing 1300 may be folded relative to each other to the closed state, so that the electronic device 2000 is in the closed state. For example, when the first housing 1200 and the second housing 1300 are in the closed state, the first housing 1200 and the second housing 1300 can be fully closed to be parallel to each other (a slight deviation is also allowed). Alternatively, the first housing 1200 and the second housing 1300 can rotate relative to each other to be close to each other (folded) or away from each other (unfolded) until an intermediate state is reached. This way, the electronic device 2000 is kept in the intermediate state. The intermediate state may be any state between the flattened state and the closed state. For example, when the first housing 1200 and the second housing 1300 are in an intermediate state, an included angle between the first housing 1200 and the second housing 1300 may be 135°, 90°, or 45°.

Therefore, the electronic device 2000 may be driven by the rotating mechanism 100, to switch between the flattened state and the closed state and be kept in the flattened state or the closed state.

When the electronic device 2000 is in the flattened state, a plane size of the electronic device 2000 is relatively large, and the flexible display 1100 is flattened. In this case, the flexible display 1100 can perform full-screen display. Therefore, the electronic device 2000 has a relatively large display area, and can present a large-screen display effect, thereby improving user experience. When the electronic device 2000 is in the folded state, the plane size of the electronic device 2000 is relatively small. In this case, a user can easily store and carry the electronic device 2000. For example, the electronic device 2000 may use the folding assembly 1000 to bend the flexible display 1100 inwards. In this case, the flexible display 1100 may be sandwiched between the first housing 1200 and the second housing 1300. In other words, the flexible display 1100 may be located on inner sides of the first housing 1200 and the second housing 1300, and presented as being wrapped by the first housing 1200 and the second housing 1300. Alternatively, the electronic device 2000 may use the folding assembly 1000 to bend the flexible display 1100 outwards. In this case, the flexible display 1100 may be exposed as an appearance structure of the electronic device 2000. In other words, the flexible display 1100 may be located on outer sides of the first housing 1200 and the second housing 1300, and presented as wrapping the first housing 1200 and the second housing 1300.

Figure 2:
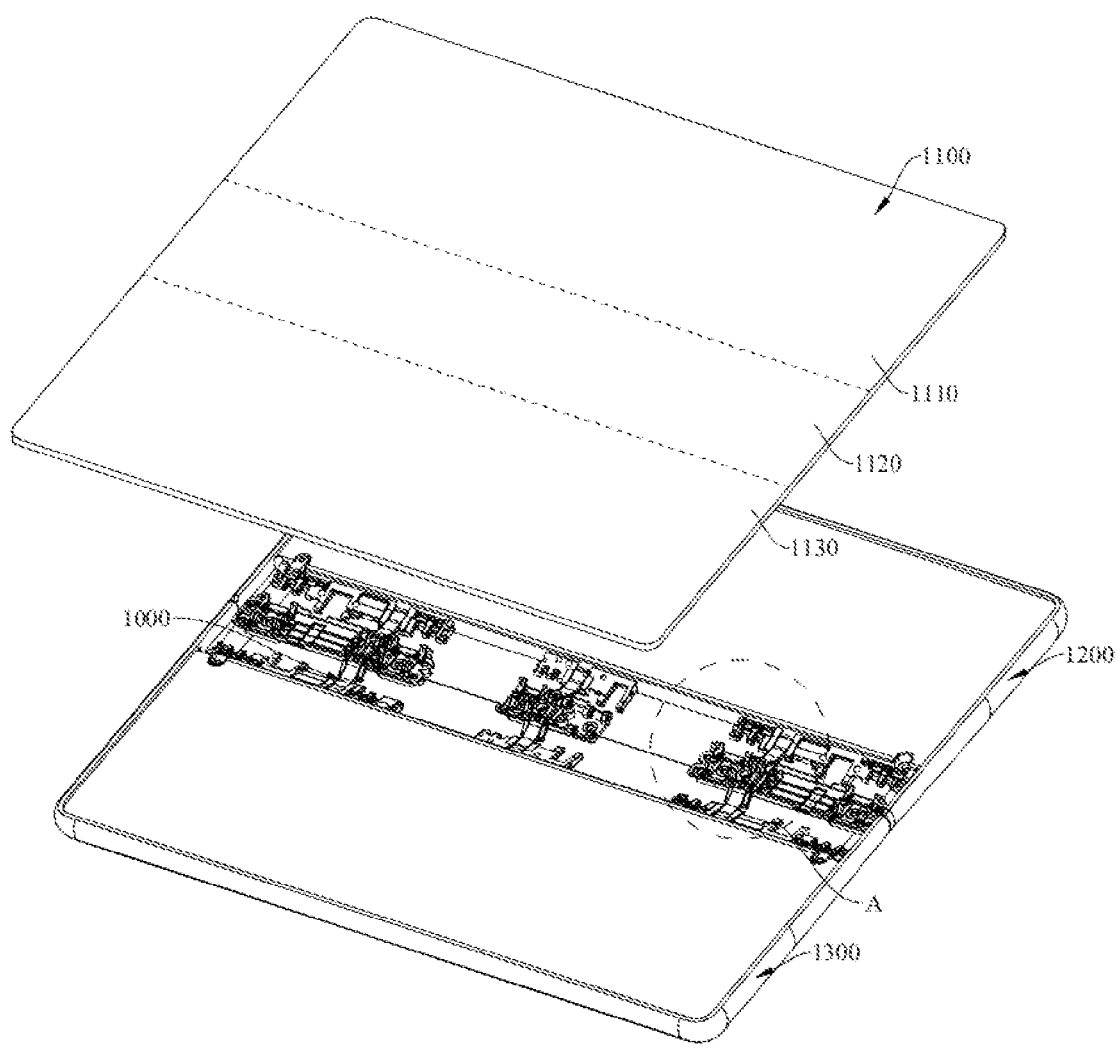
FIG. 2 is a schematic exploded view of the electronic device shown in FIG. 1.

Specifically, still refer to FIG. 2. The flexible display 1100 includes a first non-bending portion 1110, a bending portion 1120, and a second non-bending portion 1130 that are sequentially connected. The first non-bending portion 1110 is fastened to the first housing 1200, and the second non-bending portion 1130 is fastened to the second housing 1300. In a process in which the first housing 1200 and the second housing 1300 are folded and unfolded relative to each other, the bending portion 1120 deforms. For example, the flexible display 1100 may be an organic light-emitting diode (OLED) display, an active-matrix organic light-emitting diode or an active-matrix organic light-emitting diode (AMOLED) display, a mini organic light-emitting diode display, a micro light-emitting diode display, a micro organic light-emitting diode display, or a quantum dot light-emitting diode (QLED) display.

In this embodiment, the electronic device 2000 optimizes the rotating mechanism 100 of the folding assembly 1000, so that the rotating mechanism 100 of the folding assembly 1000 has a relatively small quantity of components and a simple cooperation relationship. In addition, this can ensure synchronous movement of the first housing 1200 and the second housing 1300 in a deformation process, and helps improve user experience. Details are described below.

Figure 7:
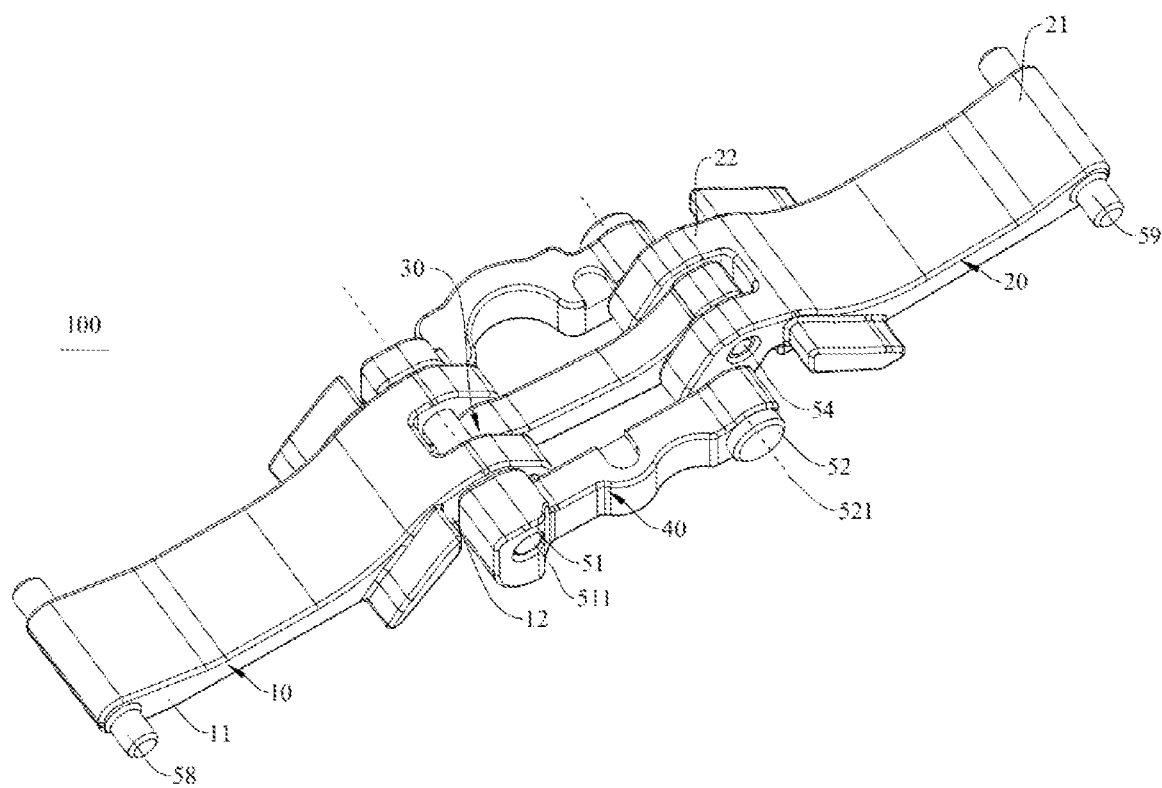
FIG. 7 is a schematic diagram depicting a structure of a rotating mechanism from an angle according to a first embodiment of the present disclosure.
Figure 8:
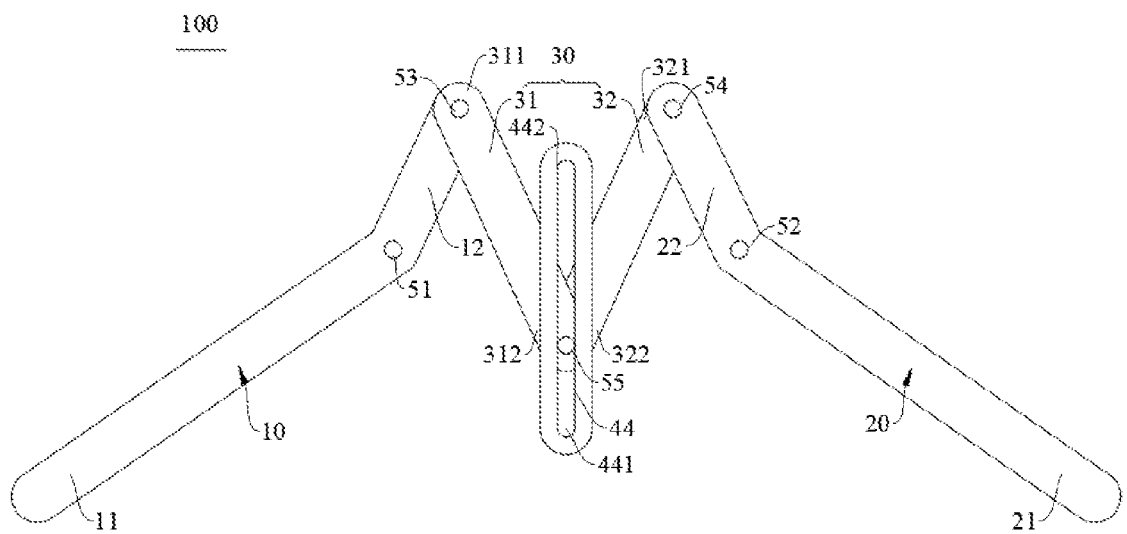
FIG. 8 is a schematic diagram depicting a structure of a rotating mechanism according to a second embodiment of the present disclosure.
Figure 9:
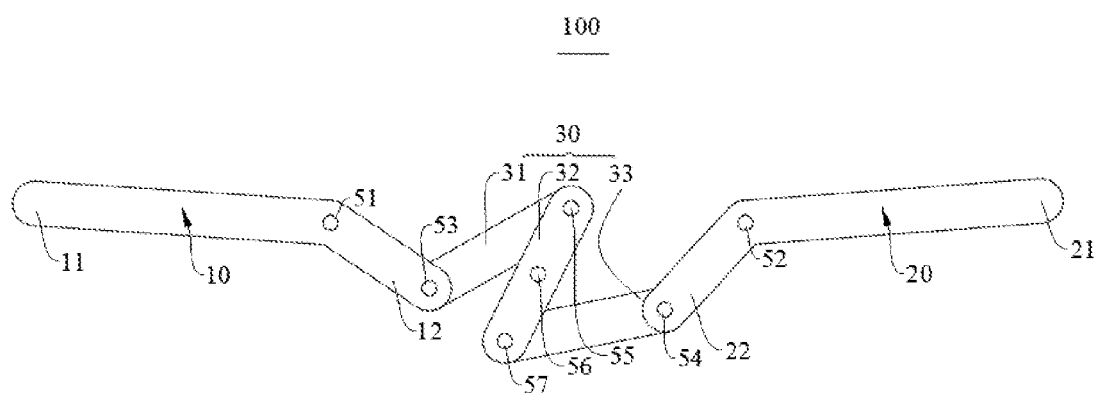
FIG. 9 is a schematic diagram depicting a structure of a rotating mechanism according to a third embodiment of the present disclosure.

Refer to FIG. 7, FIG. 8, and FIG. 9. The rotating mechanism 100 includes a first synchronous arm 10, a second synchronous arm 20, a connecting structure 30, a fastening structure 40, a first shaft 51, a second shaft 52, a third shaft 53, and a fourth shaft 54.

In this embodiment, the fastening structure 40 may be fastened to the support 400. In this case, in a process in which the first housing 1200 and the second housing 1300 are folded or unfolded relative to each other, only the first housing 1200 and the second housing 1300 synchronously rotate relative to the fastening structure 40, whereas a position of the fastening structure 40 can remain unchanged. In addition, when the first housing 1200 and the second housing 1300 are folded relative to each other to the closed state, the fastening structure 40 is located between the first housing 1200 and the second housing 1300. In other words, the fastening structure 40 can be kept relatively static, and the first housing 1200 and the second housing 1300 can rotate relative to the fastening structure 40. In a possible implementation, the fastening structure 40 and the support 400 are integrally formed. It should be noted that the fastening structure 40 may be an independent mechanical part or a combination of a plurality of mechanical parts, provided that corresponding components (such as the first shaft 51 and the second shaft 52) in the rotating mechanism can be fastened. A specific structural form of the fastening structure 40 is not strictly limited in this embodiment.

Figure 6:
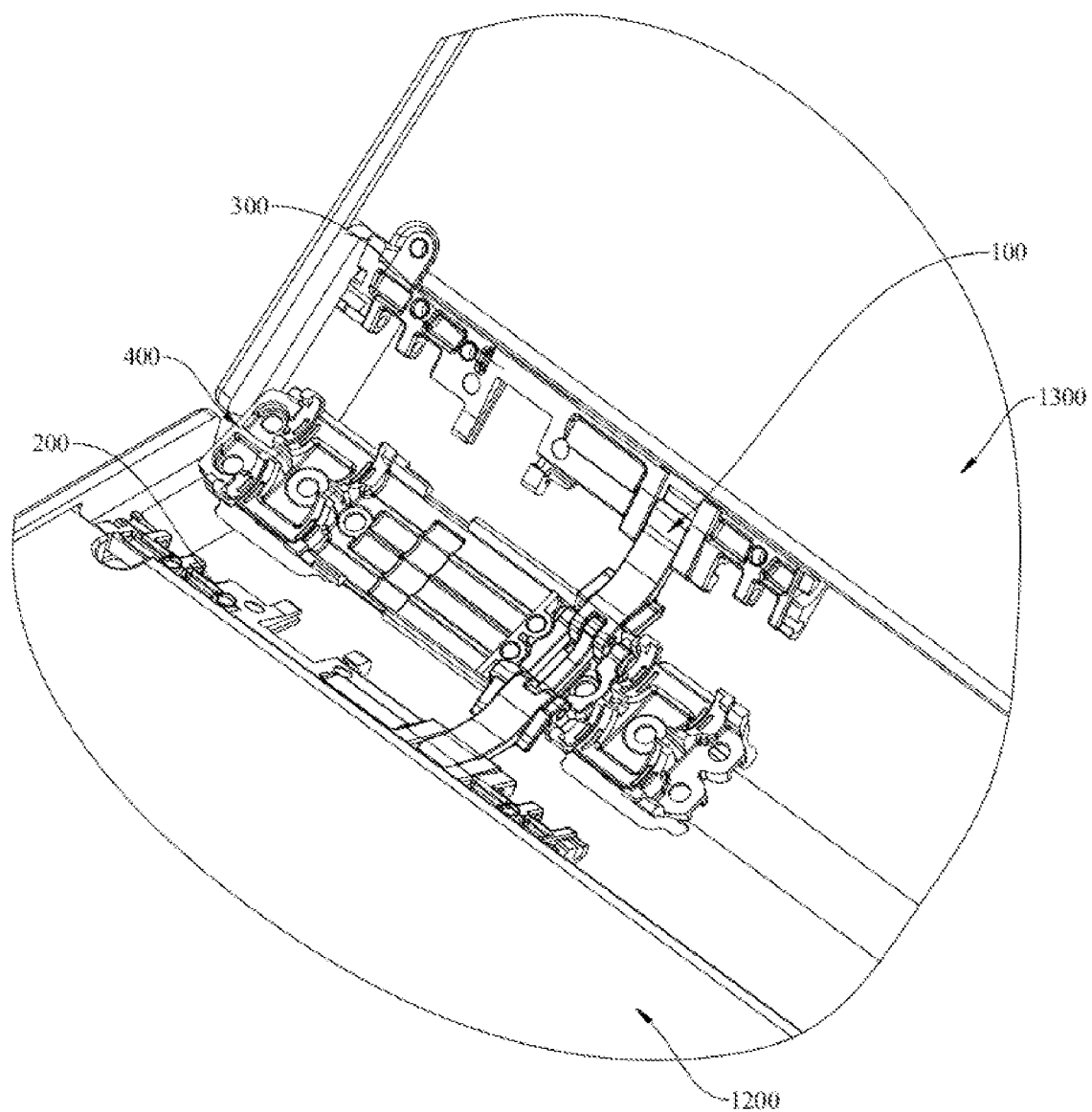
FIG. 6 is a schematic diagram depicting a structure of a folding assembly applied to an electronic device according to an embodiment of the present disclosure.

Still refer to FIG. 6, FIG. 7, and FIG. 8. The first shaft 51 is connected to the first synchronous arm 10 and the fastening structure 40, and the first synchronous arm 10 can rotate relative to the fastening structure 40. In other words, the first synchronous arm 10 is rotatably connected to the fastening structure 40 by using the first shaft 51. It should be understood that the first synchronous arm 10 can rotate relative to the fastening structure 40. Therefore, the first synchronous arm 10 has a rotation center, and the rotation center is a straight line around which the first synchronous arm 10 rotates circumferentially.

In this embodiment, a center line of the first shaft 51 is defined as a first axis 511. The first shaft 51 is connected to the fastening structure 40, and a position of the fastening structure 40 is fixed and does not change. Therefore, a position of the first shaft 51 is fixed and does not change. Accordingly, a position of the first axis 511 is also fixed and does not change. In addition, the first synchronous arm 10 may rotate relative to the fastening structure 40, and the first synchronous arm 10 is connected to the first shaft 51 connected to the fastening structure 40. Therefore, the first synchronous arm 10 may rotate relative to the first shaft 51. To be specific, the first synchronous arm 10 may rotate clockwise or counterclockwise around the first shaft 51.

It may be understood that the first axis 511 may be collinear with the rotation center of the first synchronous arm 10. Therefore, the first synchronous arm 10 may rotate around the first axis 511. To be specific, the first synchronous arm 10 may rotate clockwise or counterclockwise around the first axis 511.

In addition, the first synchronous arm 10 is further connected to the first bracket 200, and the first bracket 200 is fastened to the first housing 1200. Therefore, when the first synchronous arm 10 drives the first bracket 200 to rotate, the first housing 1200 may be driven by the first synchronous arm 10 to rotate synchronously because the first bracket 200 is fastened to the first housing 1200.

In other words, the first synchronous arm 10 can drive, through rotation of the first synchronous arm 10, the first housing 1200 to rotate, or can be driven by rotation of the first housing 1200 to rotate. To be specific, when rotating around the first axis 511, the first synchronous arm 10 may drive the first housing 1200 to rotate. Alternatively, when the first housing 1200 rotates, the first synchronous arm 10 may be driven to rotate around the first axis 511.

It should be understood that the first synchronous arm 10 and the first housing 1200 may be directly connected, or may be indirectly connected through a mechanical part (such as the first bracket 200), provided that the first synchronous arm 10 can drive the first housing 1200 to rotate synchronously when the first synchronous arm 10 rotates. This is not strictly limited in this embodiment.

Still refer to FIG. 6, FIG. 7, and FIG. 8. The second shaft 52 is connected to the second synchronous arm 20 and the fastening structure 40, and the second synchronous arm 20 can rotate relative to the fastening structure 40. In other words, the second synchronous arm 20 is rotatably connected to the fastening structure 40 by using the second shaft 52. It should be understood that the second synchronous arm 20 can rotate relative to the fastening structure 40. Therefore, the second synchronous arm 20 has a rotation center, and the rotation center is a straight line around which the second synchronous arm 20 rotates circumferentially.

In this embodiment, a center line of the second shaft 52 is defined as a second axis 521. The second shaft 52 is connected to the fastening structure 40, and a position of the fastening structure 40 is fixed and does not change. Therefore, a position of the second shaft 52 is fixed and does not change. Accordingly, a position of the second axis 521 is also fixed and does not change. In addition, the second synchronous arm 20 may rotate relative to the fastening structure 40, and the second synchronous arm 20 is connected to the second shaft 52 connected to the fastening structure 40. Therefore, the second synchronous arm 20 may rotate relative to the second shaft 52. To be specific, the second synchronous arm 20 may rotate clockwise or counterclockwise around the second shaft 52.

It may be understood that the second shaft 52 may be collinear with the rotation center of the second synchronous arm 20. Therefore, the second synchronous arm 20 can rotate around the second axis 521. To be specific, the second synchronous arm 20 may rotate clockwise or counterclockwise around the second axis 521.

In addition, the second synchronous arm 20 is further connected to the second bracket 300, and the second bracket 300 is fastened to the second housing 1300. Therefore, when the second synchronous arm 20 drives the second bracket 300 to rotate, the first housing 1200 may be driven by the second synchronous arm 20 to rotate synchronously because the second bracket 300 is fastened to the second housing 1300.

In other words, the second synchronous arm 20 can drive, through rotation of the second synchronous arm 20, the second housing 1300 to rotate, or can be driven by rotation of the second housing 1300 to rotate. To be specific, when rotating around the second axis 521, the second synchronous arm 20 may drive the second housing 1300 to rotate. Alternatively, when the second housing 1300 rotates, the second synchronous arm 20 may be driven to rotate around the second axis 521.

It should be understood that the second synchronous arm 20 and the second housing 1300 may be directly connected, or may be indirectly connected through a mechanical part (such as the second bracket 300), provided that the second synchronous arm 20 can drive the second housing 1300 to rotate synchronously when the second synchronous arm 20 rotates. This is not strictly limited in this embodiment.

The connecting structure 30 connects the first synchronous arm 10 and the second synchronous arm 20, to transfer motion and force between the first synchronous arm 10 and the second synchronous arm 20. Specifically, the third shaft 53 is connected to the first synchronous arm 10 and the connecting structure 30, and the first synchronous arm 10 and the connecting structure 30 can rotate relative to each other. In other words, the connecting structure 30 is rotatably connected to the first synchronous arm 10 by using the third shaft 53. The fourth shaft 54 is connected to the second synchronous arm 20 and the connecting structure 30, and the second synchronous arm 20 and the connecting structure 30 can rotate relative to each other. In other words, the connecting structure 30 is rotatably connected to the second synchronous arm 20 by using the fourth shaft 54. In addition, the third shaft 53 and the first shaft 51 are spaced from each other, and the fourth shaft 54 and the second shaft 52 are spaced from each other. This effectively prevents interference between components in the rotating mechanism 100, and provides a proper layout for the components in the rotating mechanism 100.

It should be noted that the connecting structure 30 may be an independent mechanical part or a combination of a plurality of mechanical parts, provided that corresponding components (such as the first synchronous arm 10 and the second synchronous arm 20) in the rotating mechanism can be connected. A specific structural form of the connecting structure 30 is not strictly limited in this embodiment.

It may be understood that the first synchronous arm 10 and the connecting structure 30 are connected and can rotate relative to each other. Therefore, when the first synchronous arm 10 rotates, the connecting structure 30 can be driven to move due to a change of coordinates at a joint between the first synchronous arm 10 and the connecting structure 30. This way, the first synchronous arm 10 and the connecting structure 30 can approach each other (an included angle between the first synchronous arm 10 and the connecting structure 30 gradually decreases), or depart from each other (an included angle between the first synchronous arm 10 and the connecting structure 30 gradually increases). In addition, the connecting structure 30 and the second synchronous arm 20 are connected and can rotate relative to each other. Therefore, when the connecting structure 30 is driven to move due to rotation of the first synchronous arm 10, the second synchronous arm 20 is driven to rotate synchronously. This way, the second synchronous arm 20 and the connecting structure 30 approach each other (an angle between the second synchronous arm 20 and the connecting structure 30 gradually decreases), or depart from each other (an included angle between the second synchronous arm 20 and the connecting structure 30 gradually increases).

Therefore, the first synchronous arm 10 can move synchronously with the second synchronous arm 20. In addition, a synchronization assembly formed by the first synchronous arm 10 and the second synchronous arm 20 is simple in structure, and a movement process of the synchronization assembly can be easily controlled with high precision. Therefore, the first housing 1200 and the second housing 1300 can move synchronously. This simplifies a structural design and a connection relationship of the rotating mechanism 100, and enhances reliability of the rotating mechanism 100.

It should be noted that synchronization functions of the first synchronous arm 10 and the second synchronous arm 20 are described above merely by using an example in which the first synchronous arm 10 serves as a driving member and the second synchronous arm 20 serves as a driven member. A principle for implementing the synchronization functions of the first synchronous arm 10 and the second synchronous arm 20 when the second synchronous arm 20 serves as the driving member and the first synchronous arm 10 serves as the driven member is basically the same as that when the first synchronous arm 10 serves as the driving member and the second synchronous arm 20 serves as the driven member. For description of the principle, refer to the foregoing description.

In this embodiment, the connecting structure 30 is connected to the first synchronous arm 10 and the second synchronous arm 20. This way, when the first synchronous arm 10 rotates as the driving member, a change of the coordinates at the joint between the first synchronous arm 10 and the connecting structure 30 can drive the connecting structure 30 to move. Then, a power transmission function of the connecting structure 30 drives the second synchronous arm 20 to passively rotate. In other words, the second synchronous arm 20 is driven to synchronously rotate as the driven member.

When the second synchronous arm 20 rotates as the driving member, a change of coordinates at a joint between the second synchronous arm 20 and the connecting structure 30 can drive the connecting structure 30 to move. Then, the power transmission function of the connecting structure 30 drives the first synchronous arm 10 to passively rotate. In other words, the first synchronous arm 10 is driven to synchronously rotate as the driven member.

Therefore, regardless of which one of the first synchronous arm 10 and the second synchronous arm 20 rotates as the driving member, the other of the first synchronous arm 10 and the second synchronous arm 20 can synchronously rotate as the driven member under an action of the connecting structure 30. This way, the first synchronous arm 10 and the second synchronous arm 20 can rotate synchronously and consistently. To be specific, the first synchronous arm 10 and the second synchronous arm 20 can synchronously rotate towards each other to be closer or synchronously rotate backwards to be farther away. In addition, the first synchronous arm 10 is connected to the first housing 1200, and the second synchronous arm 20 is connected to the second housing 1300. Therefore, in a process in which the first synchronous arm 10 and the second synchronous arm 20 approach each other, the first housing 1200 and the second housing 1300 may be folded relative to each other. In a process in which the first synchronous arm 10 and the second synchronous arm 20 depart from each other, the first housing 1200 and the second housing 1300 may be unfolded relative to each other. This also ensures synchronization and consistency between the first housing 1200 and the second housing 1300.

In addition, the rotating mechanism 100 has a small quantity of components and a simple component cooperation relationship, and features a short drive chain, a small quantity of motion transmissions, and a small cumulative error. Therefore, the rotating mechanism 100 has high control precision, and movement of the two housings can be synchronized in a deformation process. This improves rotation precision of the folding assembly 1000, and helps improve user experience of the electronic device 2000 to which the folding assembly 1000 is applied.

Figure 3:
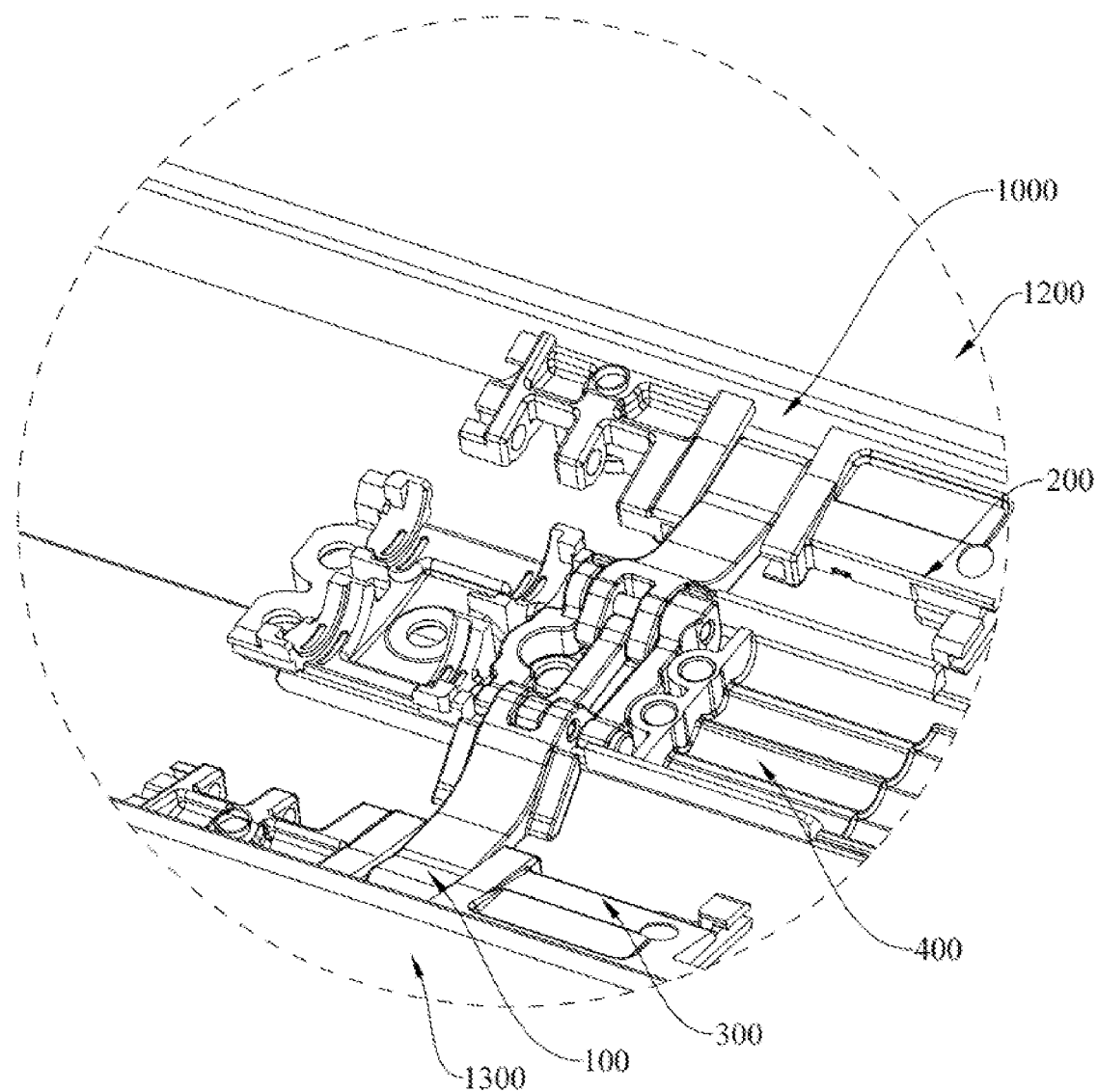
FIG. 3 is a schematic enlargement view of an area A of the electronic device shown in FIG. 2.

Refer to FIG. 3, FIG. 6, and FIG. 7. In this embodiment, the first synchronous arm 10 is connected to the fastening structure 40. The second synchronous arm 20 is also connected to the fastening structure 40, and is disposed opposite to the first synchronous arm 10. In a process in which the first housing 1200 and the second housing 1300 are folded or unfolded relative to each other, the first synchronous arm 10 and the second synchronous arm 20 synchronously rotate relative to the fastening structure 40. Therefore, positions of rotation centers of the first synchronous arm 10 and the second synchronous arm 20 are fixed and do not change. For example, when the first synchronous arm 10 and the second synchronous arm 20 rotate towards each other, the first housing 1200 and the second housing 1300 are folded relative to each other. When the first synchronous arm 10 and the second synchronous arm 20 rotate backwards, the first housing 1200 and the second housing 1300 are unfolded relative to each other.

It may be understood that the fastening structure 40 is fastened to the support 400. When the first housing 1200 and the second housing 1300 are folded relative to each other to the closed state, the support 400 is located between the first housing 1200 and the second housing 1300. Therefore, when the first housing 1200 and the second housing 1300 are folded relative to each other to the closed state, the fastening structure 40 is also located between the first housing 1200 and the second housing 1300. In other words, compared with the first housing 1200 and the second housing 1300 whose positions change, the fastening structure 40 may have a position that is fixed and does not change.

Therefore, when the first synchronous arm 10 and the second synchronous arm 20 are connected to the fastening structure 40, the first synchronous arm 10 and the second synchronous arm 20 can rotate stably and reliably because the positions of the rotation centers of the first synchronous arm 10 and the second synchronous arm 20 are fixed. In addition, when the first synchronous arm 10 and the second synchronous arm 20 rotate, a rotation angle of the first housing 1200 relative to the fastening structure 40 can be the same as that of the second housing 1300 relative to the fastening structure 40. This ensures synchronous and consistent rotation actions between the first housing 1200 and the second housing 1300 and symmetrical folding and unfolding actions of the folding assembly 1000. Therefore, user experience can be improved.

On the basis of the foregoing description, the first shaft 51 and the second shaft 52 are connected to the fastening structure 40. Therefore, the first shaft 51 and the second shaft 52 have fixed positions. The third shaft 53 and the fourth shaft 54 are connected to the connecting structure 30. Therefore, the third shaft 53 and the fourth shaft 54 have non-fixed positions. Therefore, axes of the first shaft 51 and the second shaft 52 are fixed, and axes of the third shaft 53 and the fourth shaft 54 are non-fixed. An axis is a center line of a shaft.

In this embodiment, the first axis 511 (that is, the axis of the first shaft 51) and the second axis 521 (that is, the axis of the second shaft 52) may be symmetrically disposed. This way, a symmetrical layout of "fixed axis-non-fixed axis-non-fixed axis-fixed axis" can be formed between shafts that are connected to the connecting structure 30 and the fastening structure 40 in the rotating mechanism 100. Alternatively, the first axis 511 (that is, the axis of the first shaft 51) and the second axis 521 (that is, the axis of the second shaft 52) may be asymmetrically disposed. This way, a staggered layout of "fixed axis-non-fixed axis-fixed axis-non-fixed axis" can be formed between shafts that are connected to the connecting structure 30 and the fastening structure 40 in the rotating mechanism 100. Therefore, the first synchronous arm 10 and the second synchronous arm 20 can rotate synchronously and consistently. In addition, relative positions of a plurality of shafts may be diversified. This is highly practicable and can be widely applied. The following uses three embodiments to describe in detail a position relationship between the first axis 511 and the second axis 521, and a connection relationship and a synchronization principle of each component in the rotating mechanism 100.

Embodiment 1

Refer to FIG. 5, FIG. 6, FIG. 7, and FIG. 10. In Embodiment 1 in the present disclosure, a first synchronous arm 10 includes a sliding end 11 and a rotating end 12. The sliding end 11 of the first synchronous arm 10 is connected to a first bracket 200, and the rotating end 12 of the first synchronous arm 10 is connected a connecting structure 30 and a fastening structure 40. A second synchronous arm 20 includes a sliding end 21 and a rotating end 22. The sliding end 21 of the second synchronous arm 20 is connected to the second bracket 300, and the rotating end 22 of the second synchronous arm 20 is connected the connecting structure 30 and the fastening structure 40.

For example, the first synchronous arm 10 and the second synchronous arm 20 each are generally shaped as a wavy line "~". Therefore, when mounted on the fastening structure 40, the first synchronous arm 10 and the second synchronous arm 20 can be symmetrically presented. In this case, when the first synchronous arm 10 and the second synchronous arm 20 rotate relative to each other, a first housing 1200 and a second housing 1300 can rotate synchronously and consistently.

Specifically, the rotating end 12 of the first synchronous arm 10 includes a front surface 121, a rear surface 122, and a circumferential side surface 123 that connects the front surface 121 and the rear surface 122. The front surface 121, the rear surface 122, and the circumferential side surface 123 of the rotating end 12 of the first synchronous arm 10 are connected to form an outer surface of the rotating end 12 of the first synchronous arm 10. The rotating end 22 of the second synchronous arm 20 includes a front surface 221, a rear surface 222, and a circumferential side surface 223 that connects the front surface 221 and the rear surface 222. The front surface 221, the rear surface 222, and the circumferential side surface 223 of the rotating end 22 of the second synchronous arm 20 are connected to form an outer surface of the rotating end 22 of the second synchronous arm 20.

In this embodiment, the connecting structure 30 is a connecting rod. The fastening structure 40 includes a first fastening bracket 41 and a second fastening bracket 42. The first fastening bracket 41 and the second fastening bracket 42 are mounted on a support 400. In addition, the first fastening bracket 41 and the second fastening bracket 42 are spaced from each other along an axial direction. The axial direction may be understood as a direction along which a first shaft 51 extends. The first fastening bracket 41 and the second fastening bracket 42 that are spaced from each other form space for mounting a rotating mechanism 100, and can guide the mounting of the rotating mechanism 100.

In a possible implementation, one or more notches 43 may be disposed on the first fastening bracket 41 and/or the second fastening bracket 42. The notches 43 are configured to prevent interference with another component of the folding assembly 1000. In other words, the notches 43 are configured for avoidance purposes. This improves movement reliability of the rotating mechanism 100 and the folding assembly 1000.

Figure 10:
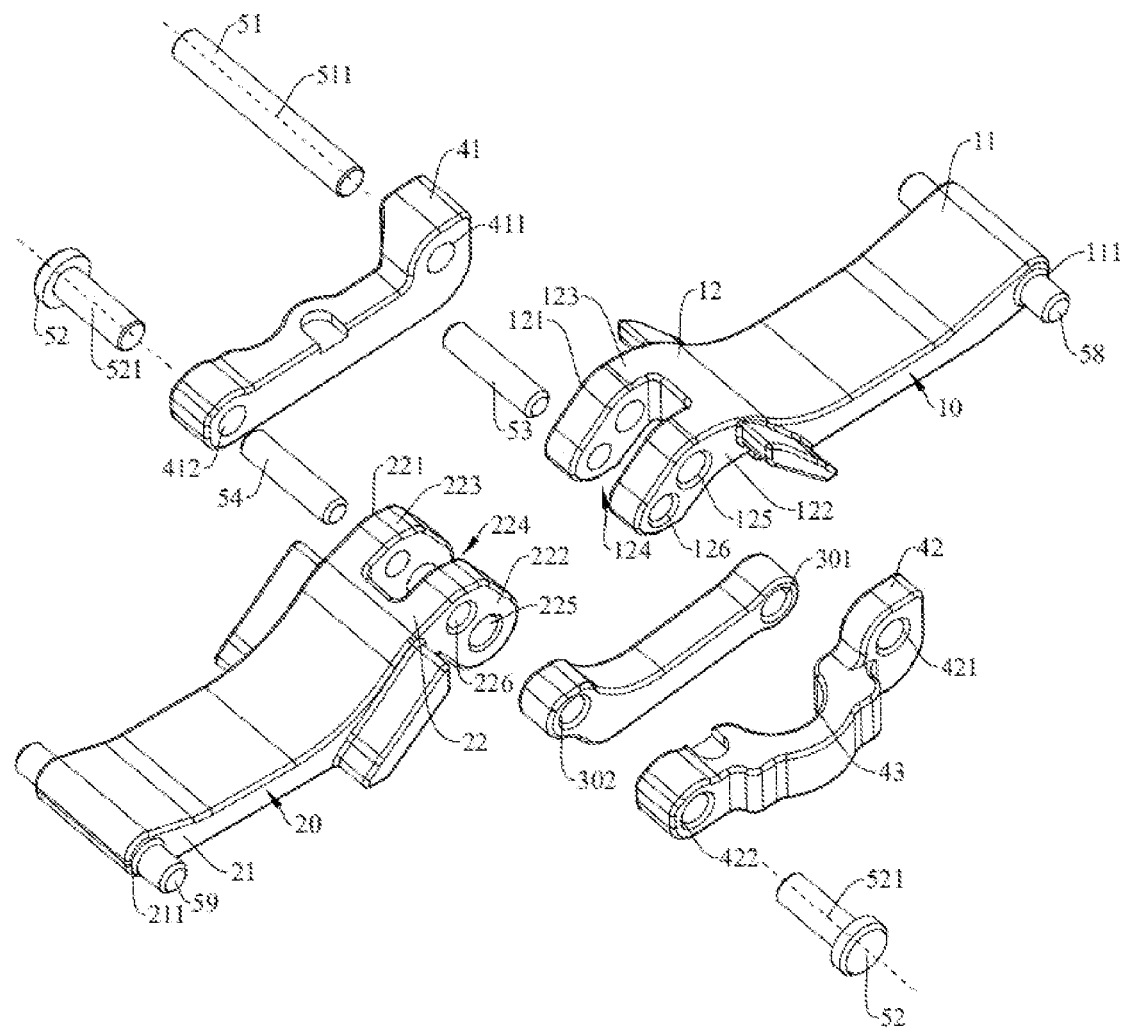
FIG. 10 is a schematic exploded view of a rotating mechanism according to a first embodiment of the present disclosure.

Refer to FIG. 7 and FIG. 10. Two ends of the first fastening bracket 41 are connected to the front surface 121 of the rotating end 12 of the first synchronous arm 10 and the front surface 221 of the rotating end 22 of the second synchronous arm 20. Two ends of the second fastening bracket 42 are connected to the rear surface 122 of the rotating end 12 of the first synchronous arm 10 and the rear surface 222 of the rotating end 22 of the second synchronous arm 20. In other words, the rotating end 12 of the first synchronous arm 10 and the rotating end 22 of the second synchronous arm 20 are sandwiched between the first fastening bracket 41 and the second fastening bracket 42.

Therefore, the first fastening bracket 41 and the second fastening bracket 42 are disposed, the first fastening bracket 41 is connected to the front surface 121 of the first synchronous arm 10 and the front surface 221 of the second synchronous arm 20, and the second fastening bracket 42 is connected to the rear surface 122 of the first synchronous arm 10 and the rear surface 222 of the second synchronous arm 20. This minimizes a possibility that the first synchronous arm 10 and the second synchronous arm 20 get loose, and ensures robust connection between and reliable and stable rotation of the first synchronous arm 10 and the second synchronous arm 20.

The circumferential side surface 123 of the rotating end 12 of the first synchronous arm 10 recesses inwards to form a first accommodating groove 124. This way, the rotating end 12 of the first synchronous arm 10 shapes like a letter "U". This facilitates connection between the rotating end 12 of the first synchronous arm 10 and the first fastening bracket 41 and the second fastening bracket 42, and connection between the connecting rod (the connecting structure 30) and the first synchronous arm 10. In addition, this reduces space occupied by the rotating mechanism 100, and the folding assembly 1000 and an electronic device 2000 to which the folding assembly 1000 is applied are lighter and thinner. The circumferential side surface 223 of the rotating end 22 of the second synchronous arm 20 recesses inwards to form a second accommodating groove 224. This way, the rotating end 22 of the second synchronous arm 20 shapes like a letter "U". This facilitates connection between the rotating end 22 of the second synchronous arm 20 and the first fastening bracket 41 and the second fastening bracket 42, and connection between the connecting rod (the connecting structure 30) and the second synchronous arm 20. In addition, this reduces the space occupied by the rotating mechanism 100, and the folding assembly 1000 and the electronic device 2000 to which the folding assembly 1000 is applied are lighter and thinner.

Specifically, two ends of the connecting rod (the connecting structure 30) are mounted in the first accommodating groove 124 and the second accommodating groove 224. This way, the first accommodating groove 124 and the second accommodating groove 224 can cooperate with each other so that the connecting rod (the connecting structure 30) can reciprocate only in movable space provided by the first accommodating groove 124 and the second accommodating groove 224.

Figure 11:
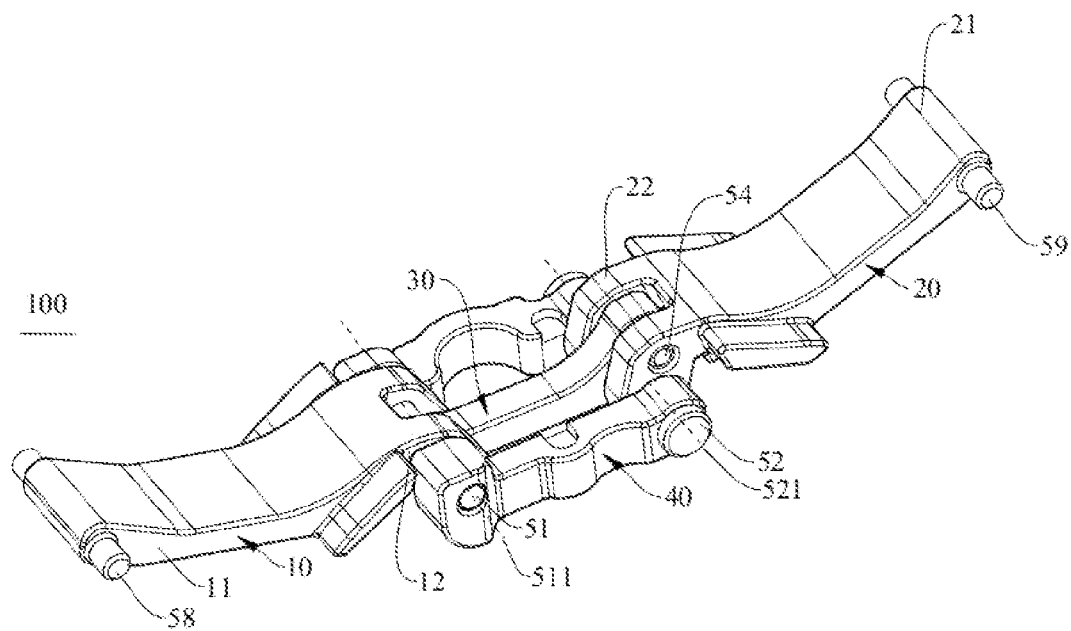
FIG. 11 is a schematic diagram depicting a state of a rotating mechanism according to a first embodiment of the present disclosure.
Figure 12:
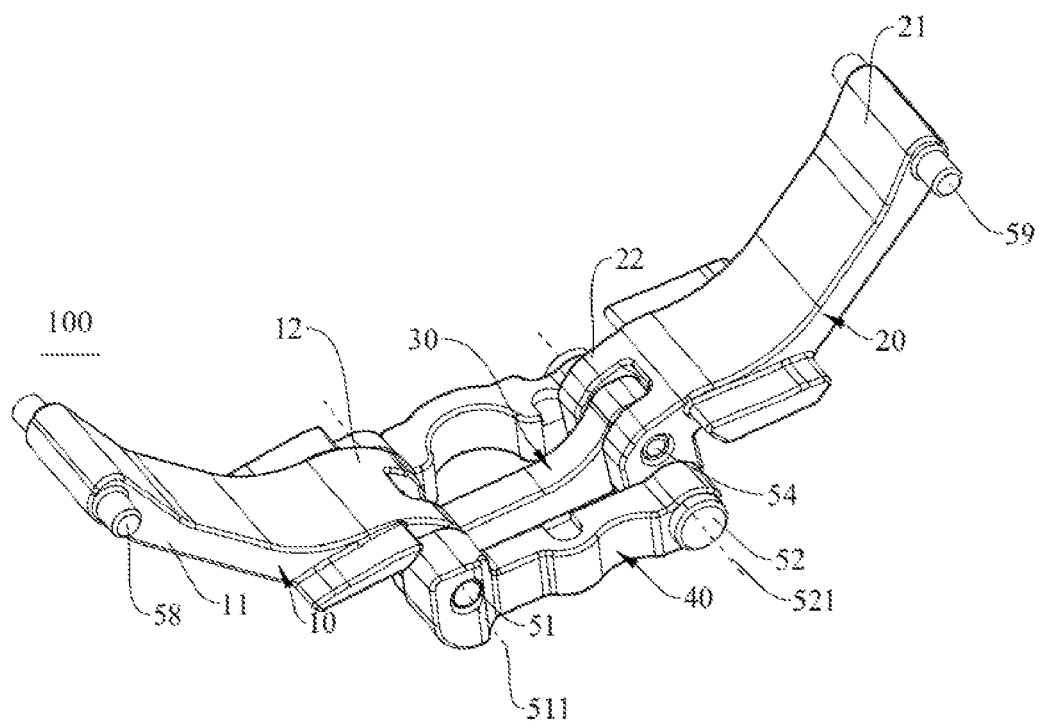
FIG. 12 is a schematic diagram depicting another state of a rotating mechanism according to a first embodiment of the present disclosure.
Figure 13:
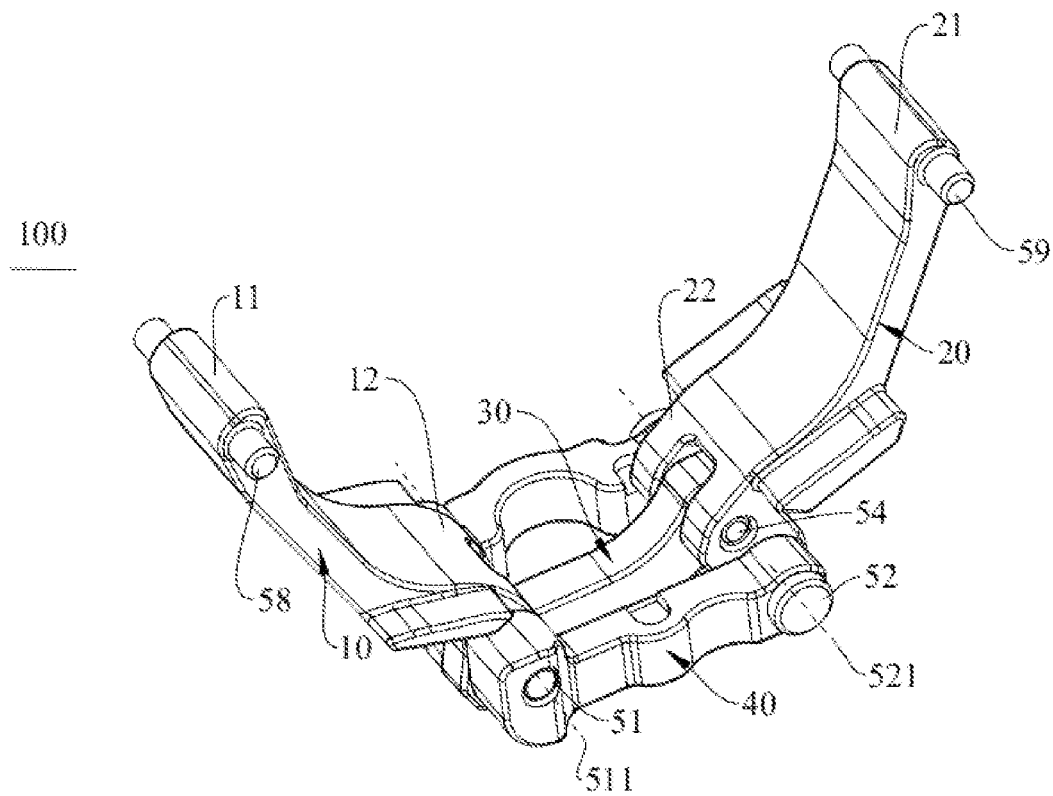
FIG. 13 is a schematic diagram depicting still another state of a rotating mechanism according to a first embodiment of the present disclosure.

Refer to FIG. 11, FIG. 12, and FIG. 13. For example, the first synchronous arm 10 rotates clockwise around a first axis 511, and drives the connecting rod (the connecting structure 30) to move towards the first synchronous arm 10. In this case, an included angle between the first synchronous arm 10 and the connecting rod (the connecting structure 30) gradually decreases as the first synchronous arm 10 and the connecting rod (the connecting structure 30) rotate relative to each other. Then, the connecting rod (the connecting structure 30) pulls the second synchronous arm 20, so that the second synchronous arm 20 synchronously rotates counterclockwise around a second axis 521. In this case, an included angle between the connecting rod (the connecting structure 30) and the second synchronous arm 20 gradually decreases as the second synchronous arm 20 and the connecting rod (the connecting structure 30) rotate relative to each other. Therefore, the first synchronous arm 10 and the second synchronous arm 20 can approach each other and drive the first housing 1200 and the second housing 1300 to fold relative to each other.

Alternatively, the first synchronous arm 10 rotates counterclockwise around the first axis 511, and drives the connecting rod (the connecting structure 30) to move towards the second synchronous arm 20. In this case, an included angle between the first synchronous arm 10 and the connecting rod (the connecting structure 30) gradually increases as the first synchronous arm 10 and the connecting rod (the connecting structure 30) rotate relative to each other. Then, the connecting rod (the connecting structure 30) pushes the second synchronous arm 20, so that the second synchronous arm 20 synchronously rotates clockwise around the second axis 521. In this case, an included angle between the connecting rod (the connecting structure 30) and the second synchronous arm 20 gradually increases as the second synchronous arm 20 and the connecting rod (the connecting structure 30) rotate relative to each other. Therefore, the first synchronous arm 10 and the second synchronous arm 20 can depart from each other and drive the first housing 1200 and the second housing 1300 to unfold relative to each other.

In a possible implementation, one or more protrusions are further disposed on the first synchronous arm 10 and the second synchronous arm 20. The protrusions can stop the first synchronous arm 10 and the second synchronous arm 20 from being moved when the folding assembly 1000 is in an unfolded state. This prevents the folding assembly 1000 from being excessively bent in an unfolding process, and therefore reduces force on a flexible display 1100 and improves reliability of the flexible display 1100 and the electronic device 2000.

In this embodiment, the rotating mechanism 100 further includes a first connecting shaft 58 and a second connecting shaft 59, in addition to the first shaft 51, a second shaft 52, a third shaft 53, and a fourth shaft 54. A plurality of shafts is disposed. This way, each component in the rotating mechanism 100 can be connected. In addition, the rotating mechanism 100 can be connected to the first housing 1200 and the second housing 1300. A conventional rotating mechanism 100 uses complex structures such as meshed gears to establish connections between components. However, in this embodiment, reliable connections can be established only through cooperation between shafts and components. The structure is simple, and easy machining operations are involved. Therefore, high machining precision can be achieved with ease.

The following describes in detail a specific implementation form of a connection relationship between components of the rotating mechanism 100 in this embodiment.

Refer to FIG. 7 and FIG. 10. The first shaft 51 passes through the first fastening bracket 41, the rotating end 12 of the first synchronous arm 10, and the second fastening bracket 42. Specifically, the first shaft 51 passes through the rotating end 12 of the first synchronous arm 10, one end of the first shaft 51 is connected to the first fastening bracket 41, and the other end of the first shaft 51 is connected to the second fastening bracket 42. Therefore, the first shaft 51 can be connected to the rotating end 12 of the first synchronous arm 10 and the fastening structure 40. In addition, the first synchronous arm 10 can rotate relative to the fastening structure 40. Therefore, a reliable connection can be established between the first synchronous arm 10 and the fastening structure 40 based on a connection function of the first shaft 51. In other words, the first synchronous arm 10 can be rotatably connected to the fastening structure 40 by using the first shaft 51.

Refer to FIG. 7 and FIG. 10. Two ends of the first shaft 51 are connected to the first fastening bracket 41 and the second fastening bracket 42. Therefore, a position of the first shaft 51 is fixed and does not change. Accordingly, a position of the first axis 511 is also fixed and does not change. In addition, the first shaft 51 is further connected to the first synchronous arm 10, and the first synchronous arm 10 may rotate relative to the first fastening bracket 41 and the second fastening bracket 42. Therefore, the first synchronous arm 10 may rotate relative to the first shaft 51.

In this embodiment, the first axis 511 may be collinear with a rotation center of the first synchronous arm 10. Therefore, the first synchronous arm 10 may rotate around the first axis 511. For example, in a process in which the first housing 1200 and the second housing 1300 are folded relative to each other, the first synchronous arm 10 may rotate clockwise around the first axis 511. In a process in which the first housing 1200 and the second housing 1300 are unfolded relative to each other, the first synchronous arm 10 may rotate counterclockwise around the first axis 511.

The third shaft 53 passes through the rotating end 12 of the first synchronous arm 10 and the connecting rod (the connecting structure 30). In addition, the third shaft 53 and the first shaft 51 are spaced from each other, and the third shaft 53 is far away from the sliding end 11 of the first synchronous arm 10 relative to the first shaft 51. In this case, the third shaft 53 passes through the connecting rod (the connecting structure 30), one end of the third shaft 53 is connected to one side wall of the first accommodating groove 124, and the other end of the third shaft 53 is connected to the other side wall of the first accommodating groove 124. Therefore, the third shaft 53 can be connected to the rotating end 12 of the first synchronous arm 10 and the connecting rod (the connecting structure 30). In addition, the first synchronous arm 10 and the connecting rod (the connecting structure 30) can rotate relative to each other. Therefore, a reliable connection can be established between the first synchronous arm 10 and the connecting rod (the connecting structure 30) based on a connection function of the third shaft 53. In other words, the first synchronous arm 10 can be rotatably connected to the connecting rod (the connecting structure 30) by using the third shaft 53.

Still refer to FIG. 10. In this embodiment, the first fastening bracket 41 is provided with a shaft hole 411 to be passed through by the first shaft 51, and the second fastening bracket 42 is provided with a shaft hole 421 to be passed through by the first shaft 51. The rotating end 12 of the first synchronous arm 10 is provided with a shaft hole 125 to be passed through by the first shaft 51 and a shaft hole 126 to be passed through by the third shaft 53. The connecting rod (the connecting structure 30) is provided with a shaft hole 301 to be passed through by the third shaft 53. Specific settings (such as positions, shapes, and sizes) of the shaft hole 411 of the first fastening bracket 41, the shaft hole 421 of the second fastening bracket 42, shaft holes (the shaft hole 125 and the shaft hole 126) at the rotating end 12 of the first synchronous arm 10, and the shaft hole 301 of the connecting rod (the connecting structure 30) adapt to connection requirements of the first shaft 51 and the third shaft 53.

Therefore, hole-shaft cooperation is implemented between the first synchronous arm 10 and the first fastening bracket 41 and the second fastening bracket 42 and between the first synchronous arm 10 and the connecting rod (the connecting structure 30). A gap of the hole-shaft cooperation is easy to control. In addition, the hole-shaft cooperation features a simple cooperation relationship and easy machining operations, and can achieve high machining precision with ease.

For example, there are two second shafts 52, and center lines of the two second shafts 52 are collinear. This can ensure that the two second shafts 52 can be disposed correspondingly without misplacement. Specifically, one of the two second shafts 52 is configured to pass through the first fastening bracket 41 and the rotating end 22 of the second synchronous arm 20, and the other of the second shafts 52 is configured to pass through the second fastening bracket 42 and the rotating end 22 of the second synchronous arm 20. In this case, one of the second shafts 52 passes through the first fastening bracket 41 from an outer side of the first fastening bracket 41, and is connected to the front surface 221 of the rotating end 22 of the second synchronous arm 20. The other of the second shafts 52 passes through the second fastening bracket 42 from an outer side of the second fastening bracket 42, and is connected to the rear surface 222 of the rotating end 22 of the second synchronous arm 20. Therefore, the second shaft 52 can be connected to the rotating end 22 of the second synchronous arm 20 and the fastening structure 40. In addition, the second synchronous arm 20 can rotate relative to the fastening structure 40. Therefore, a reliable connection can be established between the second synchronous arm 20 and the fastening structure 40 based on a connection function of the second shaft 52. In other words, the second synchronous arm 20 is rotatably connected to the fastening structure 40 by using the second shaft 52.

In this embodiment, the two second shafts 52 are connected to the first fastening bracket 41 and the second fastening bracket 42. Therefore, positions of the two second shafts 52 are fixed and do not change. Accordingly, a position of the second axis 521 is also fixed and does not change. In addition, the two second shafts 52 are further connected to the front surface and rear surface of the rotating end of the second synchronous arm 20, and the second synchronous arm 20 can rotate relative to the first fastening bracket 41 and the second fastening bracket 42. Therefore, the second synchronous arm 20 can rotate relative to the second shaft 52.

It may be understood that the second axis 521 may be collinear with a rotation center of the second synchronous arm 20. Therefore, the second synchronous arm 20 can rotate around the second axis 521. For example, in a process in which the first housing 1200 and the second housing 1300 are folded relative to each other, the second synchronous arm 20 may rotate counterclockwise around the second axis 521. In a process in which the first housing 1200 and the second housing 1300 are unfolded relative to each other, the second synchronous arm 20 may rotate clockwise around the second axis 521.

Figure 14:
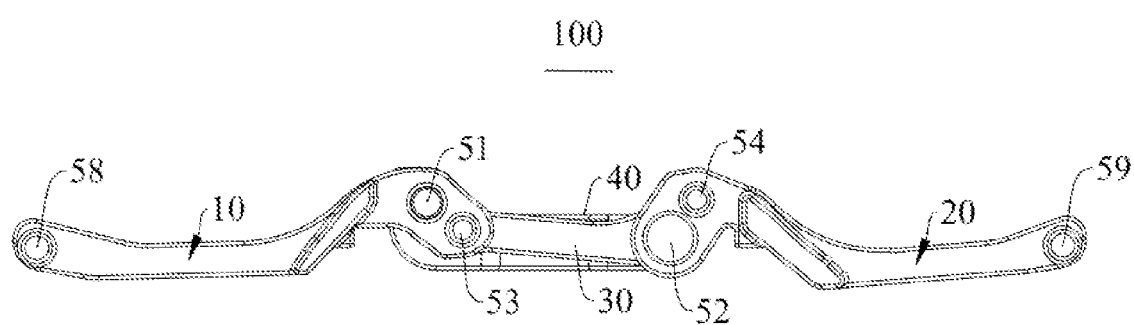
FIG. 14 is a schematic diagram depicting a structure of a rotating mechanism in a flattened state according to a first embodiment of the present disclosure.
Figure 15:
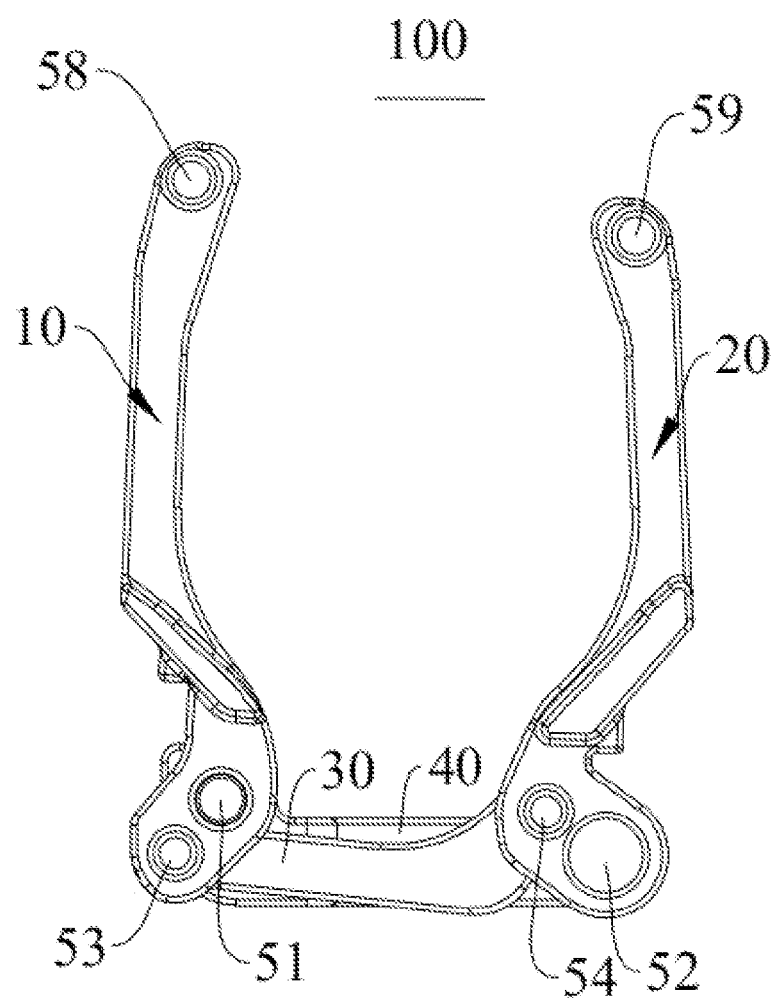
FIG. 15 is a schematic diagram depicting a structure of a rotating mechanism in a folded state according to a first embodiment of the present disclosure.

Refer to FIG. 10, FIG. 14, and FIG. 15. On the basis of the foregoing description, it should be understood that the rotation center (collinear with the second axis 521) of the second synchronous arm 20 and the rotation center (collinear with the first axis 511) of the first synchronous arm 10 are asymmetrically disposed, that is, slightly staggered or disposed in a staggered manner in this embodiment. In other words, the first axis 511 and the second axis 521 are asymmetrically disposed.

Still refer to FIG. 10. The fourth shaft 54 passes through the rotating end 22 of the second synchronous arm 20 and the connecting rod (the connecting structure 30). In addition, the fourth shaft 54 and the second shaft 52 are spaced from each other, and the fourth shaft 54 is far away from the sliding end 21 of the second synchronous arm 20 relative to the second shaft 52. In this case, the fourth shaft 54 passes through the connecting rod (the connecting structure 30), one end of the fourth shaft 54 is connected to one side wall of the second accommodating groove 224, and the other end of the fourth shaft 54 is connected to the other side wall of the second accommodating groove 224. Therefore, the fourth shaft 54 can be connected to the rotating end 22 of the second synchronous arm 20 and the connecting rod (the connecting structure 30). In addition, the second synchronous arm 20 can rotate relative to the connecting rod (the connecting structure 30). Therefore, a reliable connection can be established between the second synchronous arm 20 and the connecting rod (the connecting structure 30) based on a connection function of the fourth shaft 54. In other words, the second synchronous arm 20 is rotatably connected to the connecting rod (the connecting structure 30) by using the fourth shaft 54.

In this embodiment, the first fastening bracket 41 is provided with a shaft hole 412 to be passed through by the second shaft 52, and the second fastening bracket 42 is provided with a shaft hole 422 to be passed through by the second shaft 52. The rotating end 22 of the second synchronous arm 20 is provided with a shaft hole 225 to be passed through by the second shaft 52 and a shaft hole 226 to be passed through by the fourth shaft 54. The connecting rod (connecting structure 30) is provided with a shaft hole 302 to be passed through by the fourth shaft 54. Specific settings (such as positions, shapes, and sizes) of the shaft hole 412 of the first fastening bracket 41, the shaft hole 422 of the second fastening bracket 42, shaft holes (the shaft hole 225 and the shaft hole 226) at the rotating end 22 of the second synchronous arm 20, and the shaft hole 302 of the connecting rod (the connecting structure 30) adapt to connection requirements of the second shaft 52 and the fourth shaft 54.

Therefore, hole-shaft cooperation is implemented between the second synchronous arm 20 and the first fastening bracket 41 and the second fastening bracket 42 and between the second synchronous arm 20 and the connecting rod (the connecting structure 30). A gap of the hole-shaft cooperation is easy to control. In addition, the hole-shaft cooperation features a simple cooperation relationship and easy machining operations, and can achieve high machining precision with ease.

In this embodiment, the first connecting shaft 58 passes through the sliding end 11 of the first synchronous arm 10 and the first bracket 200. Specifically, the sliding end 11 of the first synchronous arm 10 is rotatably and slidably connected to the first bracket 200 by using the first connecting shaft 58. Therefore, in a process in which the first bracket 200 and the second bracket 300 are folded or unfolded relative to each other, the sliding end 11 of the first synchronous arm 10 slides and rotates relative to the first bracket 200. On this basis, the first synchronous arm 10 may drive the first bracket 200 to synchronously rotate.

In a possible implementation, one of the first bracket 200 and the sliding end 11 of the first synchronous arm 10 is provided with a first sliding groove. The other of the first bracket 200 and the sliding end 11 of the first synchronous arm 10 is provided with the first connecting shaft 58. The first sliding groove and the first connecting shaft 58 are connected in a fitting manner so that the first bracket and the sliding end of the first synchronous arm can slide relative to each other.

Therefore, the sliding end 11 of the first synchronous arm 10 and the first bracket 200 can slide relative to each other, regardless of whether the first sliding groove is disposed on the first bracket 200 and the first connecting shaft 58 is disposed on the sliding end 11 of the first synchronous arm 10, or the first sliding groove is disposed on the sliding end 11 of the first synchronous arm 10 and the first connecting shaft 58 is disposed on the first bracket 200. This provides possibilities for diversified connections. In addition, this is highly practicable and can be widely applied.

For example, the first sliding groove 210 is disposed on the first bracket 200. The first connecting shaft 58 extends out of both sides of the first synchronous arm 10 and is connected to the first sliding groove 210. In addition, the first connecting shaft 58 can slide relative to the first sliding groove 210. The sliding end 11 of the first synchronous arm 10 is provided with a shaft hole 111 configured to be passed through by the first connecting shaft 58. Specific settings (such as positions, shapes, and sizes) of the first sliding groove 210 of the first bracket 200 and the shaft hole 111 at the sliding end 11 of the first synchronous arm 10 adapt to a connection requirement of the first connecting shaft 58.

In other words, the first connecting shaft 58 passes through the sliding end 11 of the first synchronous arm 10, and both ends of the first connecting shaft 58 extend out of the first synchronous arm 10 and are connected to the first bracket 200. The first connecting shaft 58 can slide relative to the first bracket 200. That is, the first connecting shaft 58 passes through the sliding end 11 of the first synchronous arm 10, and the first connecting shaft 58 extends out of both sides of the first synchronous arm 10 and is connected to the first bracket 200. The first connecting shaft 58 can slide relative to the first bracket 200.

Therefore, the sliding end 11 of the first synchronous arm 10 is slidably connected to the first bracket 200 by using the first connecting shaft 58. Therefore, a reliable connection can be established between the first synchronous arm 10 and the first bracket 200 based on a connection function of the first connecting shaft 58. This way, when the first synchronous arm 10 rotates, the first housing 1200 can be driven to rotate synchronously.

In this embodiment, the second connecting shaft 59 passes through the sliding end 21 of the second synchronous arm 20 and the second bracket 300. Specifically, the sliding end 21 of the second synchronous arm 20 is rotatably and slidably connected to the second bracket 300 by using the second connecting shaft 59. Therefore, in a process in which the first bracket 200 and the second bracket 300 are folded or unfolded relative to each other, the sliding end 21 of the second synchronous arm 20 slides and rotates relative to the second bracket 300. On this basis, the second synchronous arm 20 may drive the second bracket 300 to synchronously rotate.

In a possible implementation, one of the second bracket 300 and the sliding end 21 of the second synchronous arm 20 is provided with a second sliding groove. The other of the second bracket 300 and the sliding end 21 of the second synchronous arm 20 is provided with the second connecting shaft 59. The second sliding groove and the second connecting shaft 59 are connected in a fitting manner so that the second bracket 300 and the sliding end 21 of the second synchronous arm 20 can slide relative to each other.

Therefore, the sliding end 21 of the second synchronous arm 20 and the second bracket 300 can slide relative to each other, regardless of whether the second sliding groove is disposed on the second bracket 300 and the second connecting shaft 59 is disposed on the sliding end 21 of the second synchronous arm 20, or the second sliding groove is disposed on the sliding end 21 of the second synchronous arm 20 and the second connecting shaft 59 is disposed on the second bracket 300. This provides possibilities for diversified connections. In addition, this is highly practicable and can be widely applied.

For example, the second sliding groove 310 is disposed on the second bracket 300. The second connecting shaft 59 extends out of both sides of the second synchronous arm 20 and is connected to the second sliding groove 310. In addition, the second connecting shaft 59 can slide relative to the second sliding groove 310. The sliding end 21 of the second synchronous arm 20 is provided with a shaft hole 211 configured to be passed through by the second connecting shaft 59. Specific settings (such as positions, shapes, and sizes) of the second sliding groove 310 of the second bracket 300 and the shaft hole 211 at the sliding end 21 of the second synchronous arm 20 adapt to a connection requirement of the second connecting shaft 59.

In other words, the second connecting shaft 59 passes through the sliding end 21 of the second synchronous arm 20, and both ends of the second connecting shaft 59 extend out of the second synchronous arm 20 and are connected to the second bracket 300. The second connecting shaft 59 can slide relative to the second bracket 300. That is, the second connecting shaft 59 passes through the sliding end 21 of the second synchronous arm 20, and the second connecting shaft 59 extends out of both ends of the second synchronous arm 20 and is connected to the second bracket 300. The second connecting shaft 59 can slide relative to the second bracket 300.

Therefore, the sliding end 21 of the second synchronous arm 20 is slidably connected to the second bracket 300 by using the second connecting shaft 59. Therefore, a reliable connection can be established between the second synchronous arm 20 and the second bracket 300 based on a connection function of the second connecting shaft 59. This way, when the second synchronous arm 20 rotates, the second housing 1300 can be driven to rotate synchronously.

On the basis of the foregoing description, the rotating mechanism 100 in this embodiment has a small quantity of components, a simple cooperation relationship, and simple cooperation positions. The components are easy to manufacture and assemble. This facilitates mass production. In addition, the components of the rotating mechanism 100 are connected through hole-shaft cooperation. The structure is simple, and small space is occupied. Therefore, the folding assembly 1000 and the electronic device 2000 are lighter and thinner. Further, a machining tolerance for a component can be small, and a gap generated in hole-shaft cooperation is easy to control. This can minimize a synchronization angle deviation of the rotating mechanism 100. Therefore, when the rotating mechanism 100 acts on the first housing 1200 and the second housing 1300, the first housing 1200 and the second housing 1300 can be efficiently synchronized.

It may be understood that a gap deviation may be generated at a joint of each component in the rotating mechanism 100 due to a machining tolerance. The synchronization angle deviation is a rotation angle difference caused by a gap deviation when the first synchronous arm 10 and the second synchronous arm 20 synchronously rotate. Specifically, in an ideal state, when the first synchronous arm 10 rotates by any angle from 0° to 90° relative to the fastening structure 40, the second synchronous arm 20 can synchronously rotate by the corresponding degree relative to the fastening structure 40. However, a rotation angle of the first synchronous arm 10 relative to the fastening structure 40 may differ from a rotation angle of the second synchronous arm 20 relative to the fastening structure 40 due to a machining tolerance. For example, the first synchronous arm 10 rotates by 10° relative to the fastening structure 40, and the second synchronous arm 20 rotates by 9° relative to the fastening structure 40. In this case, a rotation angle difference between the first synchronous arm 10 and the second synchronous arm 20 is 1°. Hole-shaft cooperation features high machining precision and easy-to-control gaps. If the components of the rotating mechanism 100 are connected through hole-shaft cooperation, the rotation angle difference between the first synchronous arm 10 and the second synchronous arm 20 can be minimized, and the first synchronous arm 10 and the second synchronous arm 20 can be efficiently synchronized.

Refer to FIG. 14 and FIG. 15. In this embodiment, when the rotating end 12 of the first synchronous arm 10 and the rotating end 22 of the second synchronous arm 20 depart from each other, and the sliding end 11 of the first synchronous arm 10 and the sliding end 21 of the second synchronous arm 20 approach each other, the first housing 1200 and the second housing 1300 are folded relative to each other. When the rotating end 12 of the first synchronous arm 10 and the rotating end 22 of the second synchronous arm 20 approach each other, and the sliding end 11 of the first synchronous arm 10 and the sliding end 21 of the second synchronous arm 20 depart from each other, the first housing 1200 and the second housing 1300 are unfolded relative to each other.

Therefore, in a process of folding and unfolding the folding assembly 1000, a rotation action of the first synchronous arm 10 relative to the fastening structure 40 is symmetrical to a rotation action of the second synchronous arm 20 relative to the fastening structure 40. This way, rotation actions of the first housing 1200 and the second housing 1300 relative to the support 400 are synchronized. In other words, the first housing 1200 and the second housing 1300 synchronously approach each other or depart from each other. As a result, the rotation actions of the first housing 1200 and the second housing 1300 relative to the support 400 are effectively synchronized, and mechanism operation experience of the folding assembly 1000 and the electronic device 2000 is improved.

Embodiment 2

Refer to FIG. 8. Embodiment 2 of the present disclosure describes in detail content that is different from that in Embodiment 1, whereas content that is the same as that in Embodiment 1 is ignored.

It should be noted that FIG. 8 is merely for schematically describing a connection relationship between components in a rotating mechanism 100 in this embodiment, and does not constitute a specific limitation on a connection position and a structure of each component.

Still refer to FIG. 8. A chute 44 is disposed on a fastening structure 40, and an extension direction of the chute 44 is perpendicular to that of the fastening structure 40. For example, a folding assembly 1000 is flattened and placed on a desktop, an extension direction of the fastening structure 40 is parallel to the desktop, and the extension direction of the chute 44 is perpendicular to the desktop.

In this embodiment, the connecting structure 30 includes a first connecting rod 31 and a second connecting rod 32 that are connected to each other. The first connecting rod 31 is further connected to a first synchronous arm 10, and the second connecting rod 32 is further connected to a second synchronous arm 20. Therefore, a drive chain "from the first synchronous arm 10 to the first connecting rod 31 to the second connecting rod 32 to the second synchronous arm 20" is formed in the rotating mechanism 100. The drive chain can transfer motion and ensure synchronous rotation of two housings (a first housing 1200 and a second housing 1300) of an electronic device 2000.

Specifically, the first connecting rod 31 includes a driving end 311 and a sliding end 312, and the second connecting rod 32 includes a driving end 321 and a sliding end 322. The driving end 311 of the first connecting rod 31 is connected to a rotating end 12 of the first synchronous arm 10. The driving end 311 of the first connecting rod 31 and the rotating end 12 of the first synchronous arm 10 can rotate relative to each other. The driving end 321 of the second connecting rod 32 is connected to a rotating end 22 of the second synchronous arm 20. The driving end 321 of the second connecting rod 32 and the rotating end 22 of the second synchronous arm 20 can rotate relative to each other. The sliding end 312 of the first connecting rod 31 is connected to the sliding end 322 of the second connecting rod 32. The sliding end 312 of the first connecting rod 31 and the sliding end 322 of the second connecting rod 32 are mounted in the chute 44, and can rotate relative to each other when moving synchronously relative to the chute 44.

In other words, the sliding end 312 of the first connecting rod 31 can move relative to the chute 44, and the sliding end 322 of the second connecting rod 32 can move synchronously relative to the chute 44 and the sliding end 312 of the first connecting rod 31. When the sliding end 312 of the first connecting rod 31 and the sliding end 322 of the second connecting rod 32 move synchronously relative to the chute

44, the sliding end 312 of the first connecting rod 31 and the sliding end 322 of the second connecting rod 32 can rotate relative to each other.

Therefore, the first connecting rod 31 and the second connecting rod 32 can rotate relative to each other. Then, the first connecting rod 31 and the second connecting rod 32 drive the first synchronous arm 10 and the second synchronous arm 20 to rotate towards each other, so as to approach each other. This way, the first housing 1200 and the second housing 1300 are folded relative to each other. Alternatively, the first connecting rod 31 and the second connecting rod 32 drive the first synchronous arm 10 and the second synchronous arm 20 to rotate backwards, so as to depart from each other. This way, the first housing 1200 and the second housing 1300 are unfolded relative to each other.

It may be understood that the chute 44 can convert synchronous movement of the first connecting rod 31 and the second connecting rod 32 relative to the chute 44 into relative rotation (relative folding or unfolding) between the first connecting rod 31 and the second connecting rod 32. This way, the first synchronous arm 10 and the second synchronous arm 20 can synchronously rotate (approach each other or depart from each other). In addition, the first connecting rod 31 can be linked with the first housing 1200 through the first synchronous arm 10, and the second connecting rod 32 can be linked with the second housing 1300 through the second synchronous arm 20. Therefore, the rotating mechanism 100 has relatively high tensile strength and strong extrusion resistance as a whole.

Figure 16:
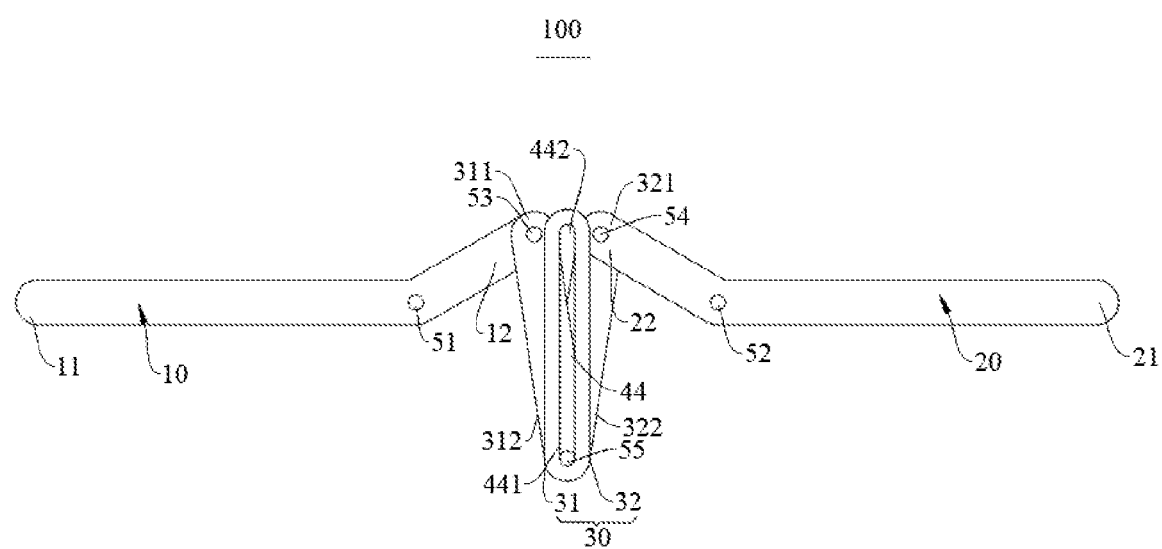
FIG. 16 is a schematic diagram depicting a structure of a rotating mechanism in a flattened state according to a second embodiment of the present disclosure.
Figure 17:
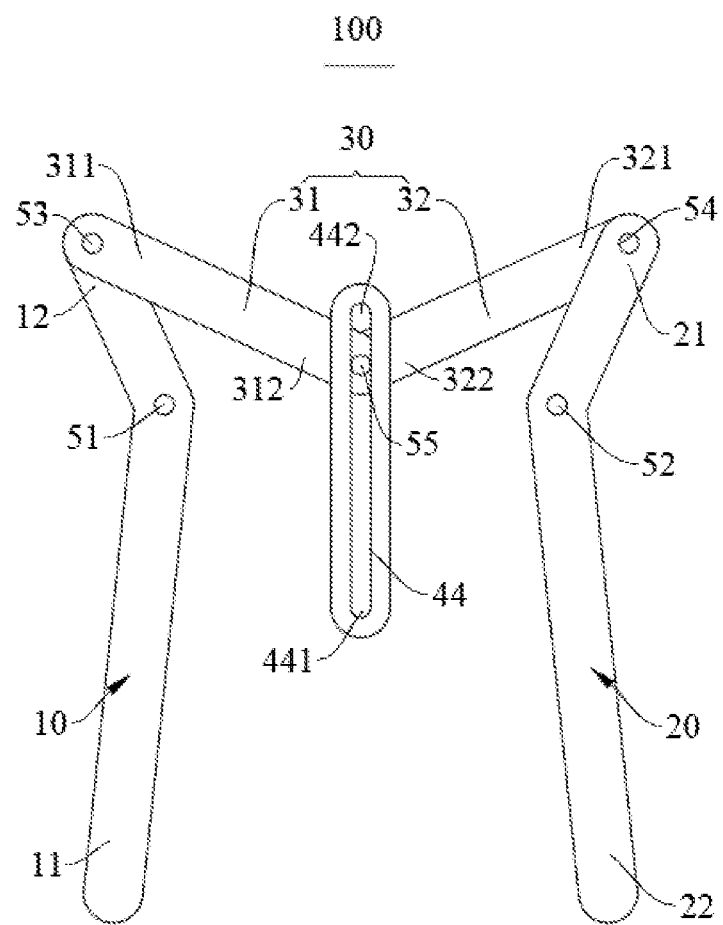
FIG. 17 is a schematic diagram depicting a structure of a rotating mechanism in a folded state according to a second embodiment of the present disclosure.

Refer to FIG. 16 and FIG. 17. For example, the desktop is used as a reference surface, and the folding assembly 1000 is flattened and placed on the desktop. A bottom 441 of the chute 44 is closer to the desktop relative to a top 442 of the chute 44, and the top 442 of the chute 44 is farther away from the desktop relative to the bottom 441 of the chute 44. When the first synchronous arm 10 rotates counterclockwise around a first shaft 51 (a first axis), the first connecting rod 31 is driven to move upwards relative to the bottom 441 of the chute 44. An included angle between the first synchronous arm 10 and the first connecting rod 31 gradually decreases as the first synchronous arm 10 and the first connecting rod 31 rotate relative to each other. The second connecting rod 32 is driven by the first connecting rod 31 to move upwards synchronously relative to the bottom 441 of the chute 44. An included angle between the second connecting rod 32 and the first connecting rod 31 gradually increases as the second connecting rod 32 and the first connecting rod 31 rotate relative to each other. The second synchronous arm 20 is driven by the second connecting rod 32 to rotate clockwise around a second shaft 52 (a second axis). An included angle between the second synchronous arm 20 and the second connecting rod 32 gradually decreases as the second synchronous arm 20 and the second connecting rod 32 rotate relative to each other. As a result, the first synchronous arm 10 and the second synchronous arm 20 approach each other, and the first housing 1200 and the second housing 1300 are folded relative to each other.

Alternatively, when the first synchronous arm 10 rotates clockwise around the first shaft 51 (the first axis), the first connecting rod 31 is driven to move downwards relative to the top 442 of the chute 44. An included angle between the first synchronous arm 10 and the first connecting rod 31 gradually increases as the first synchronous arm 10 and the second connecting rod 32 rotate relative to each other. The second connecting rod 32 is driven by the first connecting rod 31 to move downwards synchronously relative to the top 442 of the chute 44. An included angle between the second connecting rod 32 and the first connecting rod 31 gradually decreases as the second connecting rod 32 and the first connecting rod 31 rotate relative to each other. The second synchronous arm 20 is driven by the second connecting rod 32 to rotate counterclockwise around the second shaft 52 (the second axis). An included angle between the second synchronous arm 20 and the second connecting rod 32 gradually increases as the second synchronous arm 20 and the second connecting rod 32 rotate relative to each other. As a result, the first synchronous arm 10 and the second synchronous arm 20 depart from each other, and the first housing 1200 and the second housing 1300 are unfolded relative to each other.

Still refer to FIG. 8. The first connecting rod 31 and the second connecting rod 32 may be symmetrically disposed relative to the chute 44, and the first synchronous arm 10 and the second synchronous arm 20 may also be symmetrically disposed relative to the chute 44. Therefore, the first synchronous arm 10, the first connecting rod 31, the second connecting rod 32, and the second synchronous arm 20 are shaped as an inverted "W" as a whole. A symmetrical structural form can ensure symmetrical and consistent movement between the first synchronous arm 10 and the second synchronous arm 20 when the two synchronous arms move synchronously. This provides a relatively good movement form. In addition, a structure of the first connecting rod 31 may be the same as that of the second connecting rod 32, and a structure of the first synchronous arm 10 may be the same as that of the second synchronous arm 20. This simplifies a design of the rotating mechanism 100.

In this embodiment, the rotating mechanism 100 further includes a fifth shaft 55, in addition to the first shaft 51, the second shaft 52, a third shaft 53, and a fourth shaft 54. A plurality of shafts are disposed. This way, each component in the rotating mechanism 100 can be connected. A conventional rotating mechanism 100 uses complex structures such as meshed gears to establish connections between components. However, in this embodiment, reliable connections can be established only through cooperation between shafts and components. The structure is simple, and easy machining operations are involved. Therefore, high machining precision can be achieved with ease.

The following describes in detail a specific implementation form of a connection relationship between components of the rotating mechanism 100 in this embodiment. It should be noted that, in this embodiment, reference may be made to Embodiment 1 for a connection relationship between a sliding end 11 of the first synchronous arm 10 and the first housing 1200 and a connection relationship between a sliding end 21 of the second synchronous arm 20 and the second housing 1300.

Refer to FIG. 8. The first shaft 51 passes through the first synchronous arm 10 and the fastening structure 40. In this case, the first shaft 51 passes through the first synchronous arm 10, and two ends of the first shaft 51 extend out of the first synchronous arm 10 and are connected to the fastening structure 40. Therefore, the first shaft 51 can be connected to the first synchronous arm 10 and the fastening structure 40. In addition, the first synchronous arm 10 can rotate relative to the fastening structure 40. Therefore, a reliable connection can be established between the first synchronous arm 10 and the fastening structure 40 based on a connection function of the first shaft 51. In other words, the first synchronous arm 10 can be rotatably connected to the fastening structure 40 by using the first shaft 51.

For example, the first shaft 51 may pass through the rotating end 12 of the first synchronous arm 10, or pass through a middle part between the sliding end 11 and the rotating end of the first synchronous arm 10. This is not strictly limited in this embodiment.

In this embodiment, the two ends of the first shaft 51 are connected to the fastening structure 40. Therefore, a position of the first shaft 51 is fixed and does not change. Accordingly, a position of the first axis is also fixed and does not change. In addition, the first shaft 51 is further connected to the first synchronous arm 10, and the first synchronous arm 10 may rotate relative to the fastening structure 40. Therefore, the first synchronous arm 10 may rotate relative to the first shaft 51.

It may be understood that the first axis may be collinear with a rotation center of the first synchronous arm 10. Therefore, the first synchronous arm 10 may rotate around the first axis. For example, in a process in which the first housing 1200 and the second housing 1300 are folded relative to each other, the first synchronous arm 10 may rotate counterclockwise around the first axis. In a process in which the first housing 1200 and the second housing 1300 are unfolded relative to each other, the first synchronous arm 10 may rotate clockwise around the first axis.

The third shaft 53 passes through the rotating end 12 of the first synchronous arm 10 and the driving end 311 of the first connecting rod 31. In this case, the third shaft 53 is connected to the rotating end 12 of the first synchronous arm 10 and the driving end 311 of the first connecting rod 31. Therefore, the third shaft 53 can be connected to the rotating end 12 of the first synchronous arm 10 and the driving end 311 of the first connecting rod 31. In addition, the driving end 311 of the first connecting rod 31 and the rotating end 12 of the first synchronous arm 10 can rotate relative to each other. Therefore, a reliable connection can be established between the first synchronous arm 10 and the first connecting rod 31 based on a connection function of the third shaft 53. In other words, the first connecting rod 31 can be rotatably connected to the first synchronous arm 10 by using the third shaft 53.

For example, for a specific connection form among the third shaft 53, the rotating end 12 of the first synchronous arm 10, and the driving end 311 of the first connecting rod 31, refer to the connection form between the rotating end 12 of the first synchronous arm 10 and the connecting structure 30 in Embodiment 1 in FIG. 10, provided that a rotation connection is established among the third shaft 53, the rotating end 12 of the first synchronous arm 10, and the driving end 311 of the first connecting rod 31. This embodiment does not strictly limit a specific connection form among the third shaft 53, the rotating end 12 of the first synchronous arm 10, and the driving end 311 of the first connecting rod 31.

The fifth shaft 55 is connected to the chute 44, and can slide reciprocatingly in the chute 44. Reciprocating sliding may be understood as that the fifth shaft 55 can slide in the chute 44 from the bottom 441 (top 442) of the chute 44 to the top 442 (bottom 441) of the chute 44, and from the top 442 (bottom 441) of the chute 44 to the bottom 441 (top 442) of the chute 44, and repeat this process. In other words, the fifth shaft 55 is slidably connected to the chute 44.

In a possible implementation, when the fifth shaft 55 is located at the top 442 of the chute 44, an included angle between the first connecting rod 31 and the second connecting rod 32 is the largest. In this case, the first connecting rod 31 and the second connecting rod 32 are unfolded relative to each other, and the first synchronous arm 10 and the second synchronous arm 20 approach each other, so that the first housing 1200 and the second housing 1300 are folded relative to each other. When the fifth shaft 55 is located at the bottom 441 of the chute 44, an included angle between the first connecting rod 31 and the second connecting rod 32 is the smallest. In this case, the first connecting rod 31 and the second connecting rod 32 are folded relative to each other, and the first synchronous arm 10 and the second synchronous arm 20 depart from each other, so that the first housing 1200 and the second housing 1300 are unfolded relative to each other.

The fifth shaft 55 further passes through the sliding end 312 of the first connecting rod 31 and the sliding end 322 of the second connecting rod 32. In this case, the fifth shaft 55 is connected to the sliding end 312 of the first connecting rod 31 and the sliding end 322 of the second connecting rod 32. Therefore, the fifth shaft 55 can be connected to the sliding end 312 of the first connecting rod 31 and the sliding end 322 of the second connecting rod 32. In addition, the sliding end 312 of the first connecting rod 31 and the sliding end 322 of the second connecting rod 32 can rotate relative to each other. Therefore, a reliable connection can be established between the first connecting rod 31 and the second connecting rod 32 based on a connection function of the fifth shaft 55. In other words, the sliding end 312 of the first connecting rod 31 can be rotatably connected to the sliding end 322 of the second connecting rod 32 by using the fifth shaft 55.

Further, the fifth shaft 55 may slide in the chute 44 to guide synchronous movement of the first connecting rod 31 and the second connecting rod 32, so as to convert the synchronous movement of the first connecting rod 31 and the second connecting rod 32 into relative rotation between the first connecting rod 31 and the second connecting rod 32. In other words, the chute 44 can cooperate with the fifth shaft 55 to guide a direction where the sliding end 312 of the first connecting rod 31 and the sliding end 322 of the second connecting rod 32 slide in the chute 44. This facilitates relative rotation between the sliding end 312 of the first connecting rod 31 and the sliding end 322 of the second connecting rod 32, and improves control precision.

The fourth shaft 54 passes through the rotating end 22 of the second synchronous arm 20 and the driving end 321 of the second connecting rod 32. In this case, the fourth shaft 54 is connected to the rotating end 22 of the second synchronous arm 20 and the driving end 321 of the second connecting rod 32. Therefore, the fourth shaft 54 can be connected to the rotating end 22 of the second synchronous arm 20 and the driving end 321 of the second connecting rod 32. In addition, the rotating end 22 of the second synchronous arm 20 and the driving end 321 of the second connecting rod 32 can rotate relative to each other. Therefore, a reliable connection can be established between the second synchronous arm 20 and the second connecting rod 32 based on a connection function of the fourth shaft 54. In other words, the second synchronous arm 20 is rotatably connected to the second connecting rod 32 by using the fourth shaft 54.

For example, for a specific connection form among the fourth shaft 54, the rotating end 22 of the second synchronous arm 20, and the driving end 321 of the second connecting rod 32, refer to the connection form between the rotating end 22 of the second synchronous arm 20 and the connecting structure 30 in Embodiment 1 in FIG. 10, provided that a rotation connection is established among the fourth shaft 54, the rotating end 22 of the second synchronous arm 20, and the driving end 321 of the second connecting rod 32. This embodiment does not strictly limit a specific connection form among the fourth shaft 54, the rotating end 22 of the second synchronous arm 20, and the driving end 321 of the second connecting rod 32.

The second shaft 52 passes through the second synchronous arm 20 and the fastening structure 40. In this case, the second shaft 52 passes through the second synchronous arm 20, and two ends of the second shaft 52 extend out of the second synchronous arm 20 and are connected to the fastening structure 40. Therefore, the second shaft 52 can be connected to the second synchronous arm 20 and the fastening structure 40. In addition, the second synchronous arm 20 can rotate relative to the fastening structure 40. Therefore, a reliable connection can be established between the second synchronous arm 20 and the fastening structure 40 based on a connection function of the second shaft 52. In other words, the second synchronous arm is rotatably connected to the fastening structure 40 by using the second shaft 52.

For example, the second shaft 52 may pass through the rotating end 22 of the second synchronous arm 20, or pass through a middle part between the sliding end 21 and the rotating end of the second synchronous arm 20. This is not strictly limited in this embodiment.

In this embodiment, the two ends of the second shaft 52 are connected to the fastening structure 40. Therefore, a position of the second shaft 52 is fixed and does not change. Accordingly, a position of the second axis is also fixed and does not change. In addition, the second shaft 52 is further connected to the second synchronous arm 20, and the second synchronous arm 20 can rotate relative to the fastening structure 40. Therefore, the second synchronous arm 20 can rotate relative to the second shaft 52.

It may be understood that the second axis may be collinear with a rotation center of the second synchronous arm 20. Therefore, the second synchronous arm 20 can rotate around the second axis. For example, in a process in which the first housing 1200 and the second housing 1300 are folded relative to each other, the second synchronous arm 20 may rotate clockwise around the second axis. In a process in which the first housing 1200 and the second housing 1300 are unfolded relative to each other, the second synchronous arm 20 may rotate counterclockwise around the second axis.

It may be understood that the rotation center (collinear with the second axis) of the second synchronous arm 20 and the rotation center (collinear with the first axis) of the first synchronous arm 10 are symmetrically disposed in this embodiment. In other words, the first axis and the second axis are symmetrically disposed.

It should be noted that the fastening structure 40 in this embodiment may include a plurality of individual brackets, or may be an integral bracket that integrates a plurality of individual brackets. A specific structural form of the fastening structure 40 depends on an actual use requirement, provided that positions of the first shaft 51 and the second shaft 52 can be fixed. This is not strictly limited in this embodiment. In addition, in this embodiment, hole-shaft cooperation is generally implemented between a plurality of shafts of the rotating mechanism 100 and structures that are connected to the shafts. A specific implementation form of the hole-shaft cooperation is similar to that in Embodiment 1.

On the basis of the foregoing description, the rotating mechanism 100 in this embodiment uses the multi-stage connecting rods for motion transmission, so as to ensure synchronous rotation of the two brackets of the folding assembly 1000. The rotating mechanism 100 has a small quantity of components, a simple cooperation relationship, and simple cooperation positions. The components are easy to manufacture and assemble. This facilitates mass production. In addition, the components of the rotating mechanism 100 are generally connected through hole-shaft cooperation. The structure is simple, and small space is occupied. Therefore, the folding assembly 1000 and the electronic device 2000 are lighter and thinner. Further, a machining tolerance for a component can be small, and a gap generated in hole-shaft cooperation is easy to control. This can minimize a synchronization angle deviation of the rotating mechanism 100. Therefore, when the rotating mechanism 100 acts on the first housing 1200 and the second housing 1300, the first housing 1200 and the second housing 1300 can be efficiently synchronized.

In this embodiment, the rotation center (collinear with the first axis) of the first synchronous arm 10 and the rotation center (collinear with the second axis) of the second synchronous arm 20 are symmetrically disposed. Therefore, when the rotating end 12 of the first synchronous arm 10 and the rotating end 22 of the second synchronous arm 20 depart from each other, and the sliding end 11 of the first synchronous arm 10 and the sliding end 21 of the second synchronous arm 20 approach each other, the first connecting rod 31 and the second connecting rod 32 move upwards relative to the bottom 441 of the chute 44 and an included angle between the first connecting rod 31 and the second connecting rod 32 gradually increases. In this case, the first housing 1200 and the second housing 1300 are folded relative to each other. When the rotating end 12 of the first synchronous arm 10 and the rotating end 22 of the second synchronous arm 20 approach each other, and the sliding end 11 of the first synchronous arm 10 and the sliding end 21 of the second synchronous arm 20 depart from each other, the first connecting rod 31 and the second connecting rod 32 move downwards relative to the top 442 of the chute 44 and an included angle between the first connecting rod 31 and the second connecting rod 32 gradually decreases. In this case, the first housing 1200 and the second housing 1300 are unfolded relative to each other.

Therefore, in a process of folding and unfolding the folding assembly 1000, a rotation action of the first synchronous arm 10 relative to the chute 44 is symmetrical to a rotation action of the second synchronous arm 20 relative to the chute 44. A rotation action of the first connecting rod 31 relative to the chute 44 is symmetrical to a rotation action of the second connecting rod 32 relative to the chute 44. This way, rotation actions of the first housing 1200 and the second housing 1300 relative to the support 400 are synchronized. In other words, the first housing 1200 and the second housing 1300 synchronously approach each other or depart from each other. As a result, the rotation actions of the first housing 1200 and the second housing 1300 relative to the support 400 are effectively synchronized, and mechanism operation experience of the folding assembly 1000 and the electronic device 2000 is improved.

Embodiment 3

Refer to FIG. 9. Embodiment 3 of the present disclosure describes in detail content that is different from that in Embodiment 1, whereas content that is the same as that in Embodiment 1 is ignored.

It should be noted that FIG. 9 is merely for schematically describing a connection relationship between components in a rotating mechanism 100 in this embodiment, and does not constitute a specific limitation on a connection position and a structure of each component.

In this embodiment, a connecting structure 30 includes a first connecting rod 31, a second connecting rod 32, and a third connecting rod 33 that are sequentially connected to each other. The first connecting rod 31 is further connected to a first synchronous arm 10, and the third connecting rod 33 is further connected to a second synchronous arm 20. Therefore, a drive chain "from the first synchronous arm 10 to the first connecting rod 31 to the second connecting rod 32 to the third connecting rod 33 to the second synchronous arm 20" is formed in the rotating mechanism 100. The drive chain can transfer motion and ensure synchronous rotation of two housings (a first housing 1200 and a second housing 1300) of an electronic device 2000.

Still refer to FIG. 9. The second connecting rod 32 is connected to the first connecting rod 31, the third connecting rod 33, and the fastening structure 40. In addition, the second connecting rod 32 can rotate relative to the fastening structure 40. Therefore, the second connecting rod 32 has a rotation center, and the rotation center is a center line around which the second connecting rod 32 moves circumferentially.

Specifically, one end of the second connecting rod 32 is connected to one end of the first connecting rod 31, and the other end of the second connecting rod 32 is connected to one end of the third connecting rod 33. The second connecting rod 32 and the first connecting rod 31 can rotate relative to each other, and the second connecting rod 32 and the third connecting rod 33 can rotate relative to each other. An end that is of the first connecting rod 31 and that is far away from the second connecting rod 32 is connected to a rotating end 12 of the first synchronous arm 10. The rotating end 12 of the first synchronous arm 10 and the end that is of the first connecting rod 31 and that is far away from the second connecting rod 32 can rotate relative to each other. An end that is of the third connecting rod 33 and that is far away from the second connecting rod 32 is connected to a rotating end 22 of the second synchronous arm 20. The rotating end 22 of the second synchronous arm 20 and the end that is of the third connecting rod 33 and that is far away from the second connecting rod 32 can rotate relative to each other.

In this embodiment, the rotating mechanism 100 further includes a fifth shaft 55, a sixth shaft 56, and a seventh shaft 57, in addition to a first shaft 51, a second shaft 52, a third shaft 53, and a fourth shaft 54. A plurality of shafts is disposed. This way, each component in the rotating mechanism 100 can be connected. A conventional rotating mechanism 100 uses complex structures such as meshed gears to establish connections between components. However, in this embodiment, reliable connections can be established only through cooperation between shafts and components. The structure is simple, and easy machining operations are involved. Therefore, high machining precision can be achieved with ease.

The following describes in detail a specific implementation form of a connection relationship between components of the rotating mechanism 100 in this embodiment.

It should be noted that, in this embodiment, reference may be made to Embodiment 1 for a connection relationship between a sliding end 11 of the first synchronous arm 10 and the first housing 1200 and a connection relationship between a sliding end 21 of the second synchronous arm 20 and the second housing 1300.

The first shaft 51 passes through the first synchronous arm 10 and the fastening structure 40. In this case, the first shaft 51 passes through the first synchronous arm 10, and two ends of the first shaft 51 extend out of the first synchronous arm 10 and are connected to the fastening structure 40. Therefore, the first shaft 51 can be connected to the first synchronous arm 10 and the fastening structure 40. In addition, the first synchronous arm 10 can rotate relative to the fastening structure 40. Therefore, a reliable connection can be established between the first synchronous arm 10 and the fastening structure 40 based on a connection function of the first shaft 51. In other words, the first synchronous arm 10 is rotatably connected to the fastening structure 40 by using the first shaft 51.

For example, the first shaft 51 may pass through the rotating end 12 of the first synchronous arm 10, or pass through a middle part between the sliding end 11 and the rotating end of the first synchronous arm 10. This is not strictly limited in this embodiment.

In this embodiment, the two ends of the first shaft 51 are connected to the fastening structure 40. Therefore, a position of the first shaft 51 is fixed and does not change. Accordingly, a position of a first axis is also fixed and does not change. In addition, the first shaft 51 is further connected to the first synchronous arm 10, and the first synchronous arm 10 may rotate relative to the fastening structure 40. Therefore, the first synchronous arm 10 may rotate relative to the first shaft 51.

It may be understood that the first axis may be collinear with a rotation center of the first synchronous arm 10. Therefore, the first synchronous arm 10 may rotate around the first axis. For example, in a process in which the first housing 1200 and the second housing 1300 are folded relative to each other, the first synchronous arm 10 may rotate clockwise around the first axis. In a process in which the first housing 1200 and the second housing 1300 are unfolded relative to each other, the first synchronous arm 10 may rotate counterclockwise around the first axis.

The third shaft 53 passes through the rotating end 12 of the first synchronous arm 10 and the end that is of the first connecting rod 31 and that is far away from the second connecting rod 32. In this case, the third shaft 53 is connected to the rotating end 12 of the first synchronous arm 10 and the end that is of the first connecting rod 31 and that is far away from the second connecting rod 32. Therefore, the third shaft 53 can be connected to the rotating end 12 of the first synchronous arm 10 and the end that is of the first connecting rod 31 and that is far away from the second connecting rod 32. In addition, the rotating end 12 of the first synchronous arm 10 and the end that is of the first connecting rod 31 and that is far away from the second connecting rod 32 can rotate relative to each other. Therefore, a reliable connection can be established between the first synchronous arm 10 and the first connecting rod 31 based on a connection function of the third shaft 53. In other words, the end that is of the first connecting rod 31 and that is far away from the second connecting rod 32 is rotatably connected to the rotating end 12 of the first synchronous arm 10 by using the third shaft 53.

For example, for a specific connection form among the third shaft 53, the rotating end 12 of the first synchronous arm 10, and the end that is of the first connecting rod 31 and that is far away from the second connecting rod 32, refer to the connection form between the rotating end 12 of the first synchronous arm 10 and the connecting structure 30 in Embodiment 1 in FIG. 10, provided that a connection is established among the third shaft 53, the rotating end 12 of the first synchronous arm 10, and the end that is of the first connecting rod 31 and that is far away from the second connecting rod 32. This embodiment does not strictly limit a specific connection form among the third shaft 53, the rotating end 12 of the first synchronous arm 10, and the end that is of the first connecting rod 31 and that is far away from the second connecting rod 32.

The fifth shaft 55 passes through an end that is of the first connecting rod 31 and that is far away from the first synchronous arm 10 and an end that is of the second connecting rod 32 and that is far away from the third connecting rod 33. In this case, the fifth shaft 55 is connected to the end that is of the first connecting rod 31 and that is far away from the first synchronous arm 10 and the end that is of the second connecting rod 32 and that is far away from the third connecting rod 33. Therefore, the fifth shaft 55 can be connected to the end that is of the first connecting rod 31 and that is far away from the first synchronous arm 10 and the end that is of the second connecting rod 32 and that is far away from the third connecting rod 33. In addition, the end that is of the first connecting rod 31 and that is far away from the first synchronous arm 10 and the end that is of the second connecting rod 32 and that is far away from the third connecting rod 33 can rotate relative to each other. Therefore, a reliable connection can be established between the first connecting rod 31 and the second connecting rod 32 based on a connection function of the fifth shaft 55. In other words, the end that is of the first connecting rod 31 and that is far away from the first synchronous arm 10 is rotatably connected to the end that is of the second connecting rod 32 and that is far away from the third connecting rod 33 by using the fifth shaft 55.

The sixth shaft 56 passes through the second connecting rod 32 and the fastening structure 40. In this case, the sixth shaft 56 passes through the second connecting rod 32, and two ends of the sixth shaft 56 extend out of the second connecting rod 32 and are connected to the fastening structure 40. Therefore, the sixth shaft 56 can be connected to the second connecting rod 32 and the fastening structure 40. In addition, the second connecting rod 32 can rotate relative to the fastening structure 40. Therefore, a reliable connection can be established between the second connecting rod 32 and the fastening structure 40 based on a connection function of the sixth shaft 56. In other words, the second connecting rod 32 is rotatably connected to the fastening structure 40 by using the sixth shaft 56.

For example, the sixth shaft 56 may pass through a middle part between two ends of the second connecting rod 32. This is not strictly limited in this embodiment.

In this embodiment, a center line of the sixth shaft 56 is defined as a third axis. The two ends of the sixth shaft 56 are connected to the fastening structure 40. Therefore, a position of the sixth shaft 56 is fixed and does not change. Accordingly, a position of the third axis is also fixed and does not change. In addition, the sixth shaft 56 is further connected to the second connecting rod 32, and the second connecting rod 32 can rotate relative to the fastening structure 40. Therefore, the second connecting rod 32 can rotate relative to the sixth shaft 56. To be specific, the second connecting rod 32 may rotate clockwise or counterclockwise around the sixth shaft 56.

It may be understood that the third axis may be collinear with the rotation center of the second connecting rod 32. Therefore, the second connecting rod 32 may rotate around the third axis. For example, in a process in which the first housing 1200 and the second housing 1300 are folded relative to each other, the second connecting rod 32 may rotate counterclockwise around the third axis. In a process in which the first housing 1200 and the second housing 1300 are unfolded relative to each other, the second connecting rod 32 may rotate clockwise around the third axis.

The seventh shaft 57 passes through an end that is of the second connecting rod 32 and that is far away from the first connecting rod 31 and an end that is of the third connecting rod 33 and that is far away from the second synchronous arm 20. In this case, the seventh shaft 57 is connected to the end that is of the second connecting rod 32 and that is far away from the first connecting rod 31 and the end that is of the third connecting rod 33 and that is far away from the second synchronous arm 20. Therefore, the seventh shaft 57 can be connected to the end that is of the second connecting rod 32 and that is far away from the first connecting rod 31 and the end that is of the third connecting rod 33 and that is far away from the second synchronous arm 20. In addition, the end that is of the second connecting rod 32 and that is far away from the first connecting rod 31 and the end that is of the third connecting rod 33 and that is far away from the second synchronous arm 20 can rotate relative to each other. Therefore, a reliable connection can be established between the second connecting rod 32 and the third connecting rod 33 based on a connection function of the seventh shaft 57. In other words, the end that is of the second connecting rod 32 and that is far away from the first connecting rod 31 is rotatably connected to the end that is of the third connecting rod 33 and that is far away from the second synchronous arm 20 by using the seventh shaft 57.

The fourth shaft 54 passes through the rotating end 22 of the second synchronous arm 20 and an end that is of the third connecting rod 33 and that is far away from the second connecting rod 32. In this case, the fourth shaft 54 is connected to the rotating end 22 of the second synchronous arm 20 and the end that is of the third connecting rod 33 and that is far away from the second connecting rod 32. Therefore, the fourth shaft 54 can be connected to the rotating end 22 of the second synchronous arm 20 and the end that is of the third connecting rod 33 and that is far away from the second connecting rod 32. In addition, the rotating end 22 of the second synchronous arm 20 and the end that is of the third connecting rod 33 and that is far away from the second connecting rod 32 can rotate relative to each other. Therefore, a reliable connection can be established between the third connecting rod 33 and the second synchronous arm 20 based on a connection function of the fourth shaft 54. In other words, the end that is of the third connecting rod 33 and that is far away from the second connecting rod 32 is rotatably connected to the rotating end 22 of the second synchronous arm 20 by using the fourth shaft 54.

For example, for a specific connection form among the fourth shaft 54, the end that is of the third connecting rod 33 and that is far away from the second connecting rod 32, and the rotating end 22 of the second synchronous arm 20, refer to the connection form between the rotating end 12 of the first synchronous arm 10 and the connecting structure 30 in Embodiment 1 in FIG. 10, provided that a connection is established among the fourth shaft 54, the end that is of the third connecting rod 33 and that is far away from the second connecting rod 32, and the rotating end 22 of the second synchronous arm 20. This embodiment does not strictly limit a specific connection form among the fourth shaft 54, the end that is of the third connecting rod 33 and that is far away from the second connecting rod 32, and the rotating end 22 of the second synchronous arm 20.

The second shaft 52 passes through the second synchronous arm 20 and the fastening structure 40. In this case, the second shaft 52 passes through the second synchronous arm 20, and two ends of the second shaft 52 extend out of the second synchronous arm 20 and are connected to the fastening structure 40. Therefore, the second shaft 52 can be connected to the second synchronous arm 20 and the fastening structure 40. In addition, the second synchronous arm 20 can rotate relative to the fastening structure 40. Therefore, a reliable connection can be established between the second synchronous arm 20 and the fastening structure 40 based on a connection function of the second shaft 52. In other words, the second synchronous arm 20 is rotatably connected to the fastening structure 40 by using the second shaft 52.

For example, the second shaft 52 may pass through the rotating end 22 of the second synchronous arm 20, or pass through a middle part between the sliding end 21 and the rotating end of the second synchronous arm 20. This is not strictly limited in this embodiment.

In this embodiment, the two ends of the second shaft 52 are connected to the fastening structure 40. Therefore, a position of the second shaft 52 is fixed and does not change. Accordingly, a position of a second axis is also fixed and does not change. In addition, the second shaft 52 is further connected to the second synchronous arm 20, and the second synchronous arm 20 can rotate relative to the fastening structure 40. Therefore, the second synchronous arm 20 can rotate relative to the second shaft 52. To be specific, the second synchronous arm 20 may rotate clockwise or counterclockwise around the second shaft 52.

It may be understood that the second axis may be collinear with a rotation center of the second synchronous arm 20. Therefore, the second synchronous arm 20 can rotate around the second axis. For example, in a process in which the first housing 1200 and the second housing 1300 are folded relative to each other, the second synchronous arm 20 may rotate counterclockwise around the second axis. In a process in which the first housing 1200 and the second housing 1300 are unfolded relative to each other, the second synchronous arm 20 may rotate clockwise around the second axis.

It may be understood that the rotation center (collinear with the second axis) of the second synchronous arm 20 and the rotation center (collinear with the first axis) of the first synchronous arm 10 are symmetrically disposed in this embodiment. In other words, the first axis and the second axis are symmetrically disposed.

Figure 18:
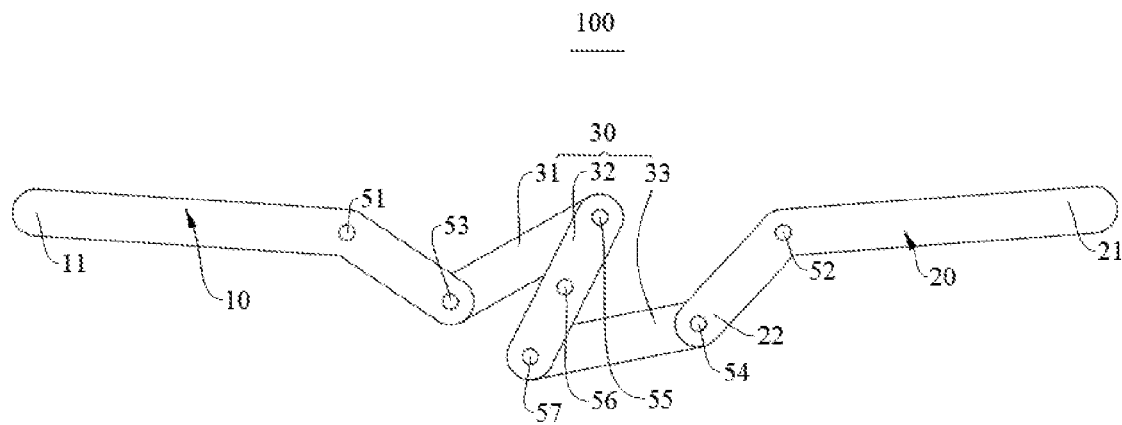
FIG. 18 is a schematic diagram depicting a structure of a rotating mechanism in a flattened state according to a third embodiment of the present disclosure.
Figure 19:
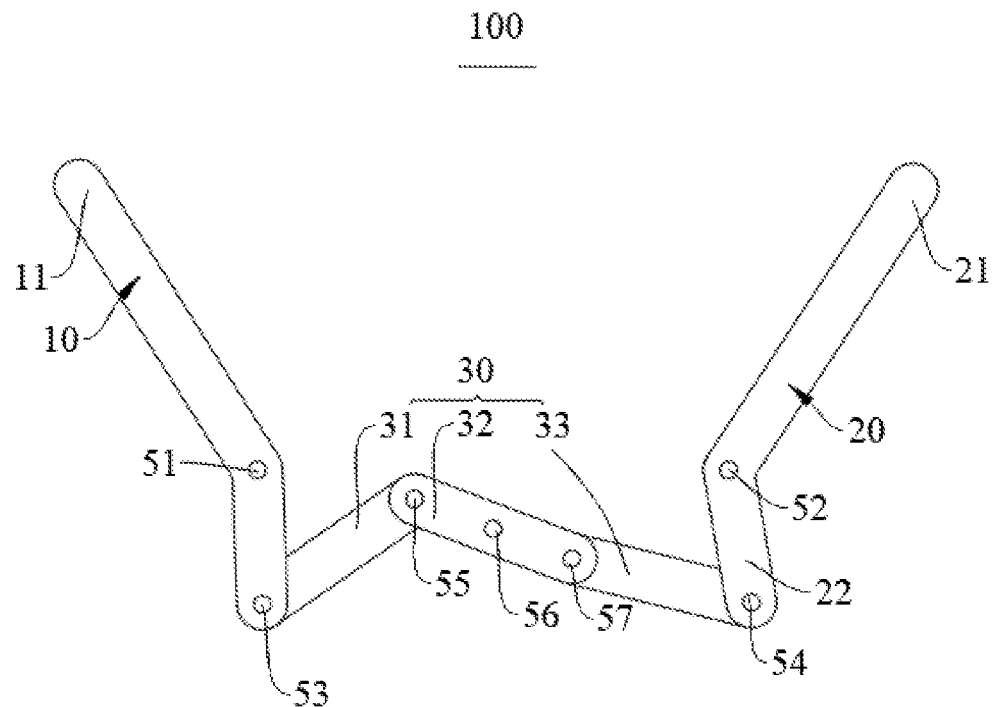
FIG. 19 is a schematic diagram depicting a structure of a rotating mechanism in a folded state according to a third embodiment of the present disclosure.

Refer to FIG. 18 and FIG. 19. For example, when the first synchronous arm 10 rotates clockwise around the first shaft 51 (the first axis), the first connecting rod 31 is driven to move towards the first synchronous arm 10. An included angle between the first synchronous arm 10 and the first connecting rod 31 gradually decreases as the first synchronous arm 10 and the first connecting rod 31 rotate relative to each other. The second connecting rod 32 is driven by the first connecting rod 31 to rotate counterclockwise around the sixth shaft 56 (the third axis). An included angle between the second connecting rod 32 and the first connecting rod 31 gradually increases as the second connecting rod 32 and the first connecting rod 31 rotate relative to each other. Rotation of the second connecting rod 32 pushes the third connecting rod 33 to move towards the second synchronous arm 20. An included angle between the second connecting rod 32 and the third connecting rod 33 gradually increases as the second connecting rod 32 and the third connecting rod 33 rotate relative to each other. The second synchronous arm 20 is driven by the third connecting rod 33 to rotate counterclockwise around the second shaft 52 (the second axis). An included angle between the second synchronous arm 20 and the third connecting rod 33 gradually decreases as the second synchronous arm 20 and the third connecting rod 33 rotate relative to each other. As a result, the first synchronous arm 10 and the second synchronous arm 20 approach each other, and the first housing 1200 and the second housing 1300 are folded relative to each other. Alternatively, when the first synchronous arm 10 rotates counterclockwise around the first shaft 51 (the first axis), the first connecting rod 31 is driven to move towards the second synchronous arm 20. An included angle between the first synchronous arm 10 and the first connecting rod 31 gradually increases as the first synchronous arm 10 and the first connecting rod 31 rotate relative to each other. The second connecting rod 32 is driven by the first connecting rod 31 to rotate clockwise around the sixth shaft 56 (the third axis). An included angle between the second connecting rod 32 and the first connecting rod 31 gradually decreases as the second connecting rod 32 and the first connecting rod 31 rotate relative to each other. Rotation of the second connecting rod 32 pulls the third connecting rod 33 to move towards the first synchronous arm 10. An included angle between the second connecting rod 32 and the third connecting rod 33 gradually decreases as the second connecting rod 32 and the third connecting rod 33 rotate relative to each other. The second synchronous arm 20 is driven by the third connecting rod 33 to rotate clockwise around the second shaft 52 (the second axis). An included angle between the second synchronous arm 20 and the third connecting rod 33 gradually increases as the second synchronous arm 20 and the third connecting rod 33 rotate relative to each other. As a result, the first synchronous arm 10 and the second synchronous arm 20 depart from each other, and the first housing 1200 and the second housing 1300 are unfolded relative to each other.

It should be noted that the fastening structure 40 in this embodiment may include a plurality of individual brackets, or may be an integral bracket that integrates a plurality of individual brackets. A specific structural form of the fastening structure 40 depends on an actual use requirement, provided that positions of the first shaft 51, the fourth shaft 54, and the seventh shaft 57 can be fixed. This is not strictly limited in this embodiment. In addition, in this embodiment, hole-shaft cooperation is generally implemented between a plurality of shafts of the rotating mechanism 100 and structures that are connected to the shafts. A specific implementation form of the hole-shaft cooperation is similar to that in Embodiment 1.

On the basis of the foregoing description, the rotating mechanism 100 in this embodiment uses the multi-stage connecting structure 30 for motion transmission, so as to ensure synchronous rotation of the two brackets of the folding assembly 1000. Compared with a conventional solution that uses gears for synchronization and features small-sized individual components, the solution provided in this embodiment uses the multi-stage connecting structure 30 for motion transmission and features relatively large-sized components. The overall structural strength is high and reliability is high. The rotating mechanism 100 has a small quantity of components, a simple cooperation relationship, and simple cooperation positions. The components are easy to manufacture and assemble. This facilitates mass production. In addition, the components of the rotating mechanism 100 are generally connected through hole-shaft cooperation. The structure is simple, and small space is occupied. Therefore, the folding assembly 1000 and the electronic device 2000 are lighter and thinner. Further, a machining tolerance for a component can be small, and a gap generated in hole-shaft cooperation is easy to control. This can minimize a synchronization angle deviation of the rotating mechanism 100. Therefore, when the rotating mechanism 100 acts on the first housing 1200 and the second housing 1300, the first housing 1200 and the second housing 1300 can be efficiently synchronized.

In this embodiment, the rotation center (collinear with the first axis) of the first synchronous arm 10 and the rotation center (collinear with the second axis) of the second synchronous arm 20 are symmetrically disposed. Therefore, when the rotating end 12 of the first synchronous arm 10 and the rotating end 22 of the second synchronous arm 20 depart from each other, and the sliding end 11 of the first synchronous arm 10 and the sliding end 21 of the second synchronous arm 20 approach each other, the first connecting rod 31, the second connecting rod 32, and the third connecting rod 33 are unfolded relative to each other. In this case, the first housing 1200 and the second housing 1300 are folded relative to each other. When the rotating end 12 of the first synchronous arm 10 and the rotating end 22 of the second synchronous arm 20 approach each other, and the sliding end 11 of the first synchronous arm 10 and the sliding end 21 of the second synchronous arm 20 depart from each other, the first connecting rod 31, the second connecting rod 32, and the third connecting rod 33 are folded relative to each other. In this case, the first housing 1200 and the second housing 1300 are unfolded relative to each other.

In other words, when the first housing 1200 and the second housing 1300 are folded relative to each other to a closed state, the first connecting rod 31, the second connecting rod 32, and the third connecting rod 33 are unfolded relative to each other. When the first housing 1200 and the second housing 1300 are unfolded relative to each other to a flattened state, the first connecting rod 31, the second connecting rod 32, and the third connecting rod 33 are folded relative to each other. It may be understood that, that the first connecting rod 31, the second connecting rod 32, and the third connecting rod 33 are unfolded relative to each other may indicate a gradual increase in an included angle between any two adjacent connecting rods. This way, the connecting rods jointly present a shape approximate to a horizontal straight line. That the first connecting rod 31, the second connecting rod 32, and the third connecting rod 33 are folded relative to each other may indicate a gradual decrease in an included angle between any two adjacent connecting rods. This way, the connecting rods jointly present a shape approximate to a letter "N".

Therefore, in a process of folding and unfolding the folding assembly 1000, a rotation action of the first synchronous arm 10 is symmetrical to a rotation action of the second synchronous arm 20. This way, rotation actions of the first housing 1200 and the second housing 1300 relative to the support 400 are synchronized. In other words, the first housing 1200 and the second housing 1300 synchronously approach each other or depart from each other. As a result, the rotation actions of the first housing 1200 and the second housing 1300 relative to the support 400 are effectively synchronized, and mechanism operation experience of the folding assembly 1000 and the electronic device 2000 is improved.

On the basis of the foregoing three embodiments, it should be understood that a structure of the rotating mechanism 100 provided in embodiments of the present disclosure features a small quantity of motion transmission stages. This way, rotation actions of the first synchronous arm 10 and the second synchronous arm 20 can be effectively synchronized. In addition, sizes of individual components can be adjusted to adapt to diversified application scenarios with different transmission distances (for example, sizes of the first synchronous arm 10, the connecting structure 30, and the second synchronous arm 20 may be relatively large in an application scenario with a long transmission distance). This is highly practicable and can be widely applied. In addition, the first synchronous arm 10 and the second synchronous arm 20 can be symmetrically folded and unfolded, so that the first housing 1200 and the second housing 1300 rotate synchronously and consistently. This facilitates inward movement of the housings in a process in which the folding assembly 1000 switches from a flattened state to a closed state and outward movement of the housings in a process in which the folding assembly 1000 switches from the closed state to the flattened state. Therefore, user experience can be improved.

Embodiments are described in detail above. The principle and implementation of the present disclosure are described herein through specific examples. The description about embodiments of the present disclosure is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A folding assembly, comprising a first bracket, a second bracket, and a rotating mechanism, wherein
   the rotating mechanism comprises a fastening structure, a first synchronous arm, a second synchronous arm, a connecting structure, a first shaft, a second shaft, a third shaft, and a fourth shaft;
   the first synchronous arm is connected to the first bracket, and is rotatably connected to the fastening structure by using the first shaft;
   the second synchronous arm is connected to the second bracket, and is rotatably connected to the fastening structure by using the second shaft;
   the connecting structure is rotatably connected to the first synchronous arm by using the third shaft and is rotatably connected to the second synchronous arm by using the fourth shaft, wherein the third shaft and the first shaft are spaced from each other, and the fourth shaft and the second shaft are spaced from each other;
   the first synchronous arm comprises a sliding end and a rotating end, the first shaft and the third shaft are connected to the rotating end of the first synchronous arm, and the first shaft is closer to the sliding end of the first synchronous arm than the third shaft;
   the second synchronous arm comprises a sliding end and a rotating end, the second shaft and the fourth shaft are connected to rotating end of the second synchronous arm, and the fourth shaft is closer to the sliding end of the second synchronous arm than the second shaft, and
   the first synchronous arm is configured to rotate relative to the fastening structure and drive the second synchronous arm to rotate relative to the fastening structure by using the connecting structure, so that the first bracket and the second bracket are folded or unfolded relative to each other.

2. The folding assembly according to claim 1, wherein a center line of the first shaft is a first axis, and
   a center line of the second shaft is a second axis, wherein the first axis and the second axis are disposed asymmetrically.

3. The folding assembly according to claim 2, wherein the rotating mechanism further comprises a first connecting shaft and a second connecting shaft;

the sliding end of the first synchronous arm is slidably connected to the first bracket by using the first connecting shaft; and the sliding end of the second synchronous arm is slidably connected to the second bracket by using the second connecting shaft.

4. The folding assembly according to claim 3, wherein one of the first bracket and the sliding end of the first synchronous arm comprises a first sliding groove, the other one of the first bracket and the sliding end of the first synchronous arm comprises the first connecting shaft, and the first sliding groove and the first connecting shaft are connected in a fitting manner so that the first bracket and the sliding end of the first synchronous arm can slide relative to each other; and one of the second bracket and the sliding end of the second synchronous arm comprises a second sliding groove, the other one of the second bracket and the sliding end of the second synchronous arm comprises the second connecting shaft, and the second sliding groove and the second connecting shaft are connected in a fitting manner so that the second bracket and the sliding end of the second synchronous arm can slide relative to each other.

5. The folding assembly according to claim 1, wherein the connecting structure is a connecting rod, wherein the first synchronous arm is configured to rotate clockwise around the first shaft and drive the connecting rod to move towards the first synchronous arm, and the second synchronous arm is driven by the connecting rod to rotate counterclockwise around the second shaft, so that the first bracket and the second bracket are folded relative to each other; or the first synchronous arm is configured to rotate counterclockwise around the first shaft and drive the connecting rod to move towards the second synchronous arm, and the second synchronous arm is driven by the connecting rod to rotate clockwise around the second shaft, so that the first bracket and the second bracket are unfolded relative to each other.

6. The folding assembly according to claim 1, wherein the fastening structure comprises a first fastening bracket and a second fastening bracket, the first fastening bracket and the second fastening bracket are spaced from each other in an axial direction, and a rotating end of the first synchronous arm and the rotating end of the second synchronous arm are sandwiched between the first fastening bracket and the second fastening bracket;

the first shaft passes through the rotating end of the first synchronous arm, one end of the first shaft is connected to the first fastening bracket, and the other end of the first shaft is connected to the second fastening bracket; and there are two second shafts, center lines of the two second shafts are collinear, one of the second shafts is connected to the first fastening bracket and the rotating end of the second synchronous arm, and the other one of the second shafts is connected to the second fastening bracket and the rotating end of the second synchronous arm.

7. The folding assembly according to claim 6, wherein the connecting structure is a connecting rod, the rotating end of the first synchronous arm comprises a first accommodating groove, the rotating end of the second synchronous arm comprises a second accommodating groove, and two ends of the connecting rod are respectively mounted in the first accommodating groove and the second accommodating groove.

8. The folding assembly according to claim 7, wherein the third shaft passes through a connecting rod, one end of the third shaft is connected to one side wall of the first accommodating groove, and the other end of the third shaft is connected to the other side wall of the first accommodating groove; and the fourth shaft passes through the connecting rod, one end of the fourth shaft is connected to one side wall of the second accommodating groove, and the other end of the fourth shaft is connected to the other side wall of the second accommodating groove.

9. The folding assembly according to claim 1, wherein a center line of the first shaft is a first axis, and a center line of the second shaft is a second axis, wherein the first axis and the second axis are symmetrically disposed.

10. The folding assembly according to claim 9, wherein the rotating mechanism further comprises a fifth shaft, the connecting structure comprises a first connecting rod and a second connecting rod, the first connecting rod comprises a driving end and a sliding end, and the second connecting rod comprises a driving end and a sliding end;

the driving end of the first connecting rod is rotatably connected to the first synchronous arm by using the third shaft, the driving end of the second connecting rod is rotatably connected to the second synchronous arm by using the fourth shaft, and the sliding end of the first connecting rod is rotatably connected to the sliding end of the second connecting rod by using the fifth shaft;

the fastening structure comprises a chute, an extension direction of the chute is perpendicular to an extension direction of the fastening structure, and the fifth shaft is slidably connected to the chute; and movement of the fifth shaft in the chute drives the sliding end of the first connecting rod and the sliding end of the second connecting rod to move relative to the chute, so that the first connecting rod and the second connecting rod are folded or unfolded relative to each other.

11. The folding assembly according to claim 10, wherein the first connecting rod and the second connecting rod are symmetrically disposed.

12. The folding assembly according to claim 10, wherein when the fifth shaft is located at a top of the chute, the first connecting rod and the second connecting rod are unfolded relative to each other, and the first synchronous arm and the second synchronous arm approach each other; and when the fifth shaft is located at a bottom of the chute, the first connecting rod and the second connecting rod are folded relative to each other, and the first synchronous arm and the second synchronous arm depart from each other.

13. The folding assembly according to claim 10, wherein the first synchronous arm is configured to rotate counterclockwise around the first shaft and drive the first connecting rod and the second connecting rod to move upwards relative to the bottom of the chute, and the second synchronous arm is driven by the second connecting rod to rotate clockwise around the second shaft, so that the first bracket and the second bracket are folded relative to each other; or the first synchronous arm is configured to rotate clockwise around the first shaft and drive the first connecting rod and the second connecting rod to move downwards relative to the top of the chute, and the second synchronous arm is driven by the second connecting rod to rotate counterclockwise around the second shaft, so that the first bracket and the second bracket are unfolded relative to each other.

14. The folding assembly according to claim 9, wherein the rotating mechanism further comprises a fifth shaft, a sixth shaft, and a seventh shaft, and the connecting structure comprises a first connecting rod, a second connecting rod, and a third connecting rod that are sequentially connected;

one end of the first connecting rod is rotatably connected to the first synchronous arm by using the third shaft, the other end of the first connecting rod is rotatably connected to one end of the second connecting rod by using the fifth shaft, the second connecting rod is rotatably connected to the fastening structure by using the sixth shaft, the other end of the second connecting rod is rotatably connected to one end of the third connecting rod by using the seventh shaft, and the other end of the third connecting rod is rotatably connected to the second synchronous arm by using the fourth shaft; and the second connecting rod is configured to rotate around the sixth shaft relative to the fastening structure.

15. The folding assembly according to claim 14, wherein when the first bracket and the second bracket are folded relative to each other to a closed state, the first connecting rod, the second connecting rod, and the third connecting rod are unfolded relative to each other; and when the first bracket and the second bracket are unfolded relative to each other to a flattened state, the first connecting rod, the second connecting rod, and the third connecting rod are folded relative to each other.

16. The folding assembly according to claim 14, wherein the first synchronous arm is configured to rotate clockwise around the first shaft and drive the first connecting rod to move towards the first synchronous arm, the second connecting rod is driven by the first connecting rod to rotate counterclockwise around the sixth shaft and drives the third connecting rod to move towards the second synchronous arm, and the second synchronous arm is driven by the third connecting rod to rotate counterclockwise around the second shaft, so that the first bracket and the second bracket are folded relative to each other; or the first synchronous arm is configured to rotate counterclockwise around the first shaft and drive the first connecting rod to move towards the second synchronous arm, the second connecting rod is driven by the first connecting rod to rotate clockwise around the sixth shaft and drives the third connecting rod to move towards the first synchronous arm, and the second synchronous arm is driven by the third connecting rod to rotate clockwise around the second shaft, so that the first bracket and the second bracket are unfolded relative to each other.

17. An electronic device, wherein the electronic device comprises a first housing, a second housing, and a folding assembly, wherein the folding assembly comprises a first bracket, a second bracket, and a rotating mechanism;

the rotating mechanism comprises a fastening structure, a first synchronous arm, a second synchronous arm, a connecting structure, a first shaft, a second shaft, a third shaft, and a fourth shaft;

the first synchronous arm is connected to the first bracket, and is rotatably connected to the fastening structure by using the first shaft;

the second synchronous arm is connected to the second bracket, and is rotatably connected to the fastening structure by using the second shaft;

the connecting structure is rotatably connected to the first synchronous arm by using the third shaft and is rotatably connected to the second synchronous arm by using the fourth shaft, wherein the third shaft and the first shaft are spaced from each other, and the fourth shaft and the second shaft are spaced from each other, the first synchronous arm comprises a sliding end and a rotating end, the first shaft and the third shaft are connected to the rotating end of the first synchronous arm, and the first shaft is closer to the sliding end of the first synchronous arm the third shaft;

the second synchronous arm comprises a sliding end and a rotating end, the second shaft and the fourth shaft are connected to the rotating end of the second synchronous arm, and the fourth shaft is closer to the sliding end of the second synchronous arm than the second shaft; and the first synchronous arm is configured to rotate relative to the fastening structure and drive the second synchronous arm to rotate relative to the fastening structure by using a connecting rod, so that the first bracket and the second bracket are folded or unfolded relative to each other, wherein the first bracket is fastened to the first housing, and the second bracket is fastened to the second housing.

18. The folding assembly according to claim 17, wherein a center line of the first shaft is a first axis, and a center line of the second shaft is a second axis, wherein the first axis and the second axis are disposed asymmetrically.

19. The folding assembly according to claim 18, wherein the rotating mechanism further comprises a first connecting shaft and a second connecting shaft;

the sliding end of the first synchronous arm is slidably connected to the first bracket by using the first connecting shaft, and the sliding end of the second synchronous arm is slidably connected to the second bracket by using the second connecting shaft.

20. The folding assembly according to claim 19, wherein one of the first bracket and the sliding end of the first synchronous arm comprises a first sliding groove, the other one of the first bracket and the sliding end of the first synchronous arm comprises the first connecting shaft, and the first sliding groove and the first connecting shaft are connected in a fitting manner so that the first bracket and the sliding end of the first synchronous arm can slide relative to each other; and one of the second bracket and the sliding end of the second synchronous arm comprises a second sliding groove, the other one of the second bracket and the sliding end of the second synchronous arm comprises the second connecting shaft, and the second sliding groove and the second connecting shaft are connected in a fitting manner so that the second bracket and the sliding end of the second synchronous arm can slide relative to each other.

* * * * *